United States Patent
Uchiyama et al.

(10) Patent No.: US 9,438,760 B2
(45) Date of Patent: Sep. 6, 2016

(54) SCANNER

(71) Applicant: FUNAI ELECTRIC CO., LTD., Osaka (JP)

(72) Inventors: Manabu Uchiyama, Osakasayama (JP); Ryuichi Aikawa, Daito (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 14/724,317

(22) Filed: May 28, 2015

(65) Prior Publication Data

US 2015/0350475 A1 Dec. 3, 2015

(30) Foreign Application Priority Data

May 28, 2014 (JP) ................................. 2014-110019
Jun. 11, 2014 (JP) ................................. 2014-120877
May 12, 2015 (JP) ................................. 2015-097709

(51) Int. Cl.
*H04N 1/04* (2006.01)
*H04N 1/00* (2006.01)

(52) U.S. Cl.
CPC ........ *H04N 1/00734* (2013.01); *H04N 1/0071* (2013.01); *H04N 1/0075* (2013.01); *H04N 1/00713* (2013.01); *H04N 1/00737* (2013.01); *H04N 1/00748* (2013.01); *H04N 1/00755* (2013.01); *H04N 1/00769* (2013.01)

(58) Field of Classification Search
CPC .......... B65H 2220/01; B65H 2220/03; B65H 2511/11; B65H 2511/13; B65H 2511/40; B65H 2511/524; B65H 2301/5111; B65H 2511/512; B65H 2557/23; B65H 2801/06; B65H 2801/15; B65H 35/04; B65H 7/02

USPC .............. 358/474, 1.14, 1.16, 449, 1.2, 475; 399/9

See application file for complete search history.

(56) References Cited

U.S. PATENT DOCUMENTS

| | | | |
|---|---|---|---|
| 4,875,104 A * | 10/1989 | Kamon ........................ | 358/400 |
| 6,297,885 B1 | 10/2001 | Murakami | |
| 7,782,498 B2 | 8/2010 | Hoshi | |
| 7,782,504 B2 * | 8/2010 | Okubo ............... | H04N 1/00543 271/3.08 |
| 7,813,010 B2 | 10/2010 | Michiie et al. | |
| 8,493,576 B2 * | 7/2013 | Enomoto ........... | H04N 1/00347 358/1.13 |
| 8,705,148 B2 * | 4/2014 | Carlson ................ | H04N 1/0057 358/1.12 |
| 8,842,303 B2 * | 9/2014 | Yoshigae ........... | H04N 1/00013 358/1.1 |

(Continued)

FOREIGN PATENT DOCUMENTS

| | | |
|---|---|---|
| JP | 8-110662 | 4/1996 |
| JP | 2000-3109 | 1/2000 |

(Continued)

OTHER PUBLICATIONS

Extended European Search Report issued Nov. 4, 2015 in corresponding European Application No. 15169500.4.

*Primary Examiner* — Negussie Worku
(74) *Attorney, Agent, or Firm* — Wenderoth, Lind & Ponack, L.L.P.

(57) ABSTRACT

A scanner including: a medium which is conveyed in a first direction along a conveying path; a read unit disposed in a second direction perpendicular to the first direction; a light emitting unit that emits first light to the read unit across the conveying path; and a detection unit that detects a length of the medium in the second direction, based on information on an intensity of the first light detected in the second direction.

11 Claims, 23 Drawing Sheets

(56) References Cited

U.S. PATENT DOCUMENTS

| | | | |
|---|---|---|---|
| 8,970,923 B2* | 3/2015 | Oosaki | H04N 1/00655 358/474 |
| 8,991,821 B2* | 3/2015 | Oosaki | B65H 7/20 271/270 |
| 2002/0050520 A1* | 5/2002 | Ando et al. | 235/454 |
| 2004/0211904 A1* | 10/2004 | Scowen et al. | 250/341.1 |
| 2005/0276198 A1* | 12/2005 | Kokubo | 369/53.22 |
| 2006/0028696 A1 | 2/2006 | Michiie et al. | |
| 2006/0193013 A1 | 8/2006 | Hoshi | |
| 2008/0094668 A1* | 4/2008 | Matsui | 358/449 |
| 2009/0122360 A1* | 5/2009 | Tanaka et al. | 358/474 |
| 2013/0201130 A1* | 8/2013 | Uchiyama | G06F 3/0418 345/173 |
| 2014/0306395 A1* | 10/2014 | Suzuki | 270/18 |
| 2015/0002863 A1* | 1/2015 | Kameda | 358/1.2 |

FOREIGN PATENT DOCUMENTS

| | | |
|---|---|---|
| JP | 2001-285584 | 10/2001 |
| JP | 2004-120425 | 4/2004 |
| JP | 2004-129141 | 4/2004 |
| JP | 2005-164716 | 6/2005 |
| JP | 2006-197438 | 7/2006 |
| JP | 2006-238288 | 9/2006 |
| JP | 2008-16951 | 1/2008 |
| JP | 2008-245209 | 10/2008 |
| JP | 2010-68410 | 3/2010 |
| JP | 2011-19218 | 1/2011 |
| JP | 2012-39316 | 2/2012 |
| JP | 5211960 | 6/2013 |

* cited by examiner

| Type of paper | Length of side 1 [mm] | Length of side 2 [mm] |
|---|---|---|
| A4 | 210 | 297 |
| Letter | 216 | 279 |
| B5 | 182 | 257 |
| ... | ... | ... |

FIG. 13
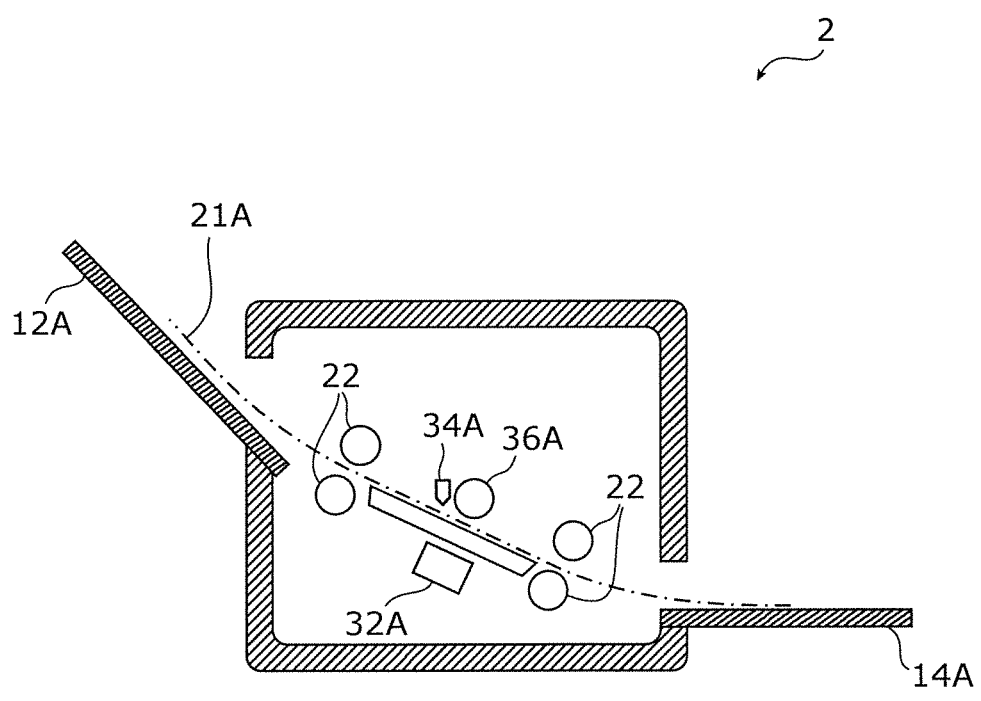
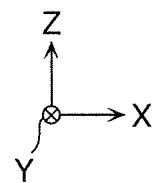

FIG. 14
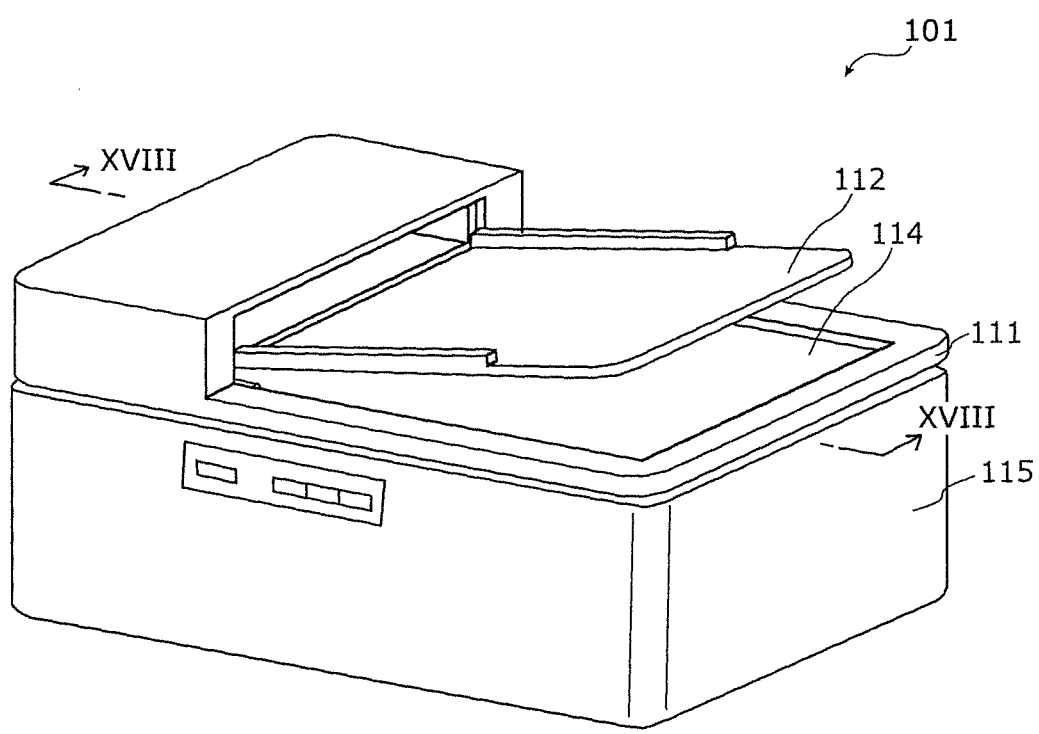
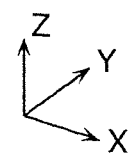

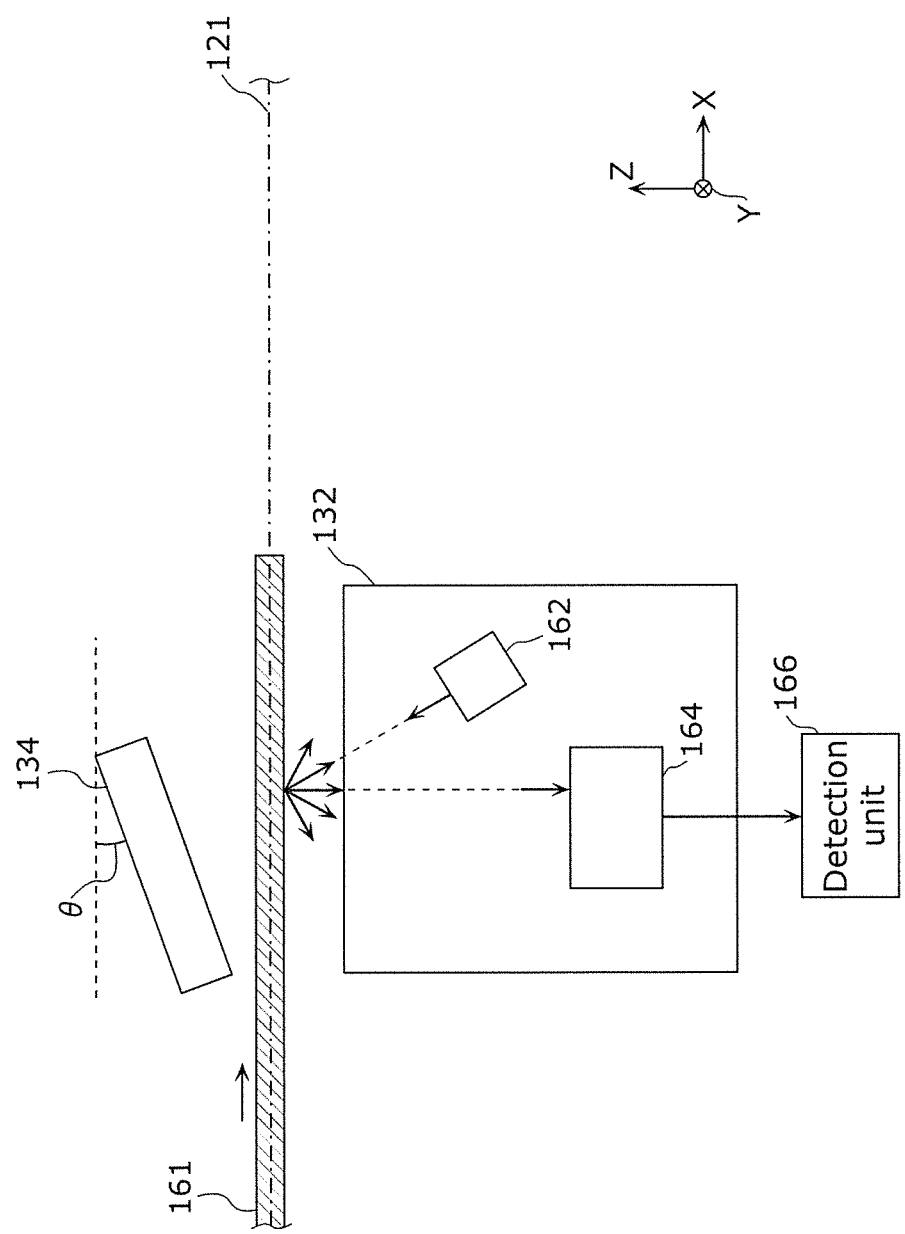

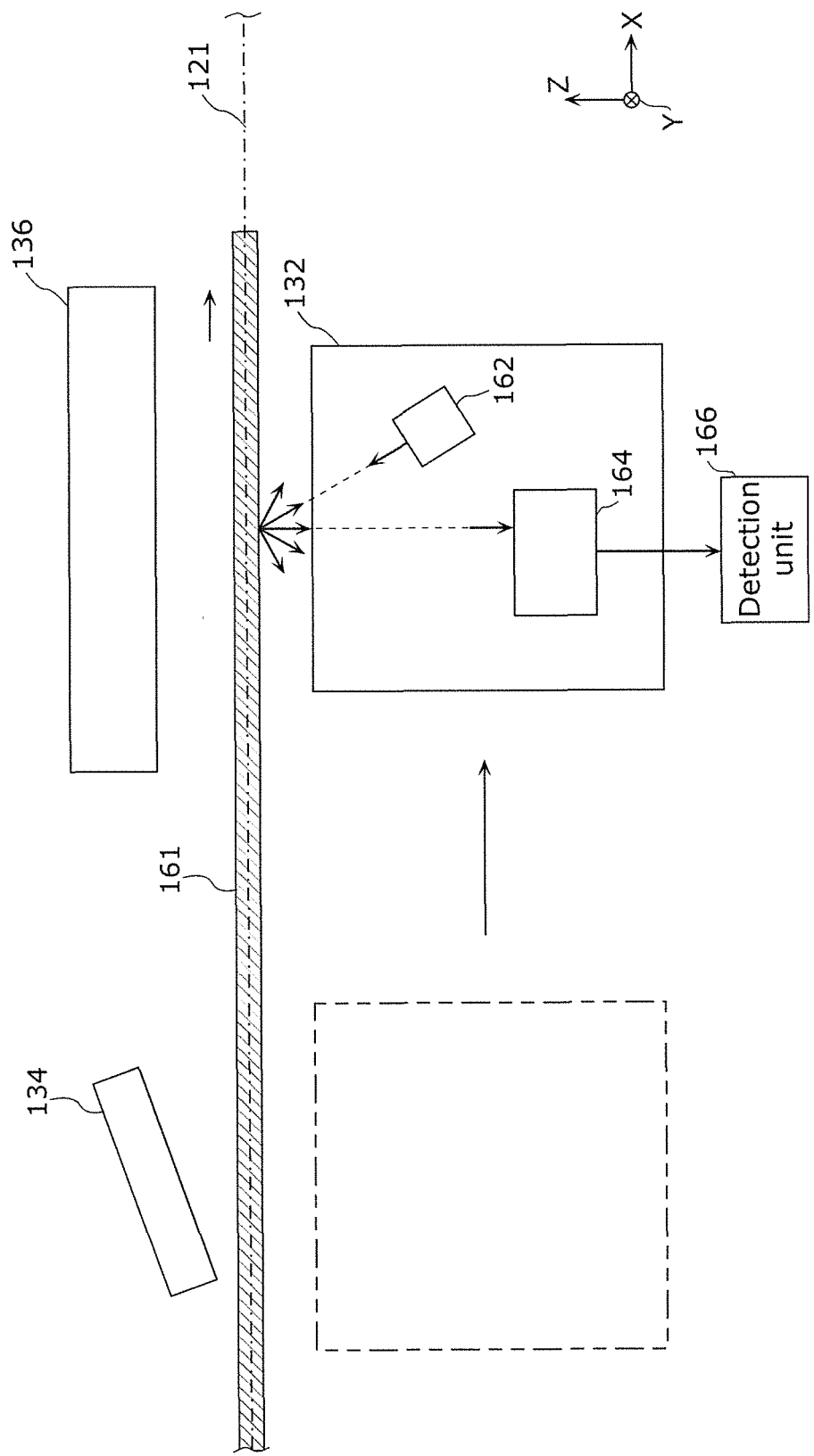

SCANNER

CROSS REFERENCE TO RELATED APPLICATIONS

The present applications are based on and claim priorities of Japanese Patent Application No. 2014-110019 filed on May 28, 2014, Japanese Patent Application No. 2014-120877 filed on Jun. 11, 2014, and Japanese Patent Application No. 2015-097709 filed on May 12, 2015. The entire disclosures of the above-identified applications, including the specifications, drawings and claims are incorporated herein by reference in their entirety.

FIELD

The present invention relates to a scanner.

BACKGROUND

A scanner (generally, also referred to as an image reading apparatus) which reads an image of a document is known. Also, a scanner (hereinafter, also referred to as an "ADF scanner"), equipped with auto document feeder (ADF), which reads images of a plurality of documents, while sequentially conveying the plurality of documents to be read, is known.

Prior to reading a document while conveying it, the ADF scanner detects a size of the document. One of its purposes is to detect a document jam. Document jam refers to a failure of a conveyance mechanism for conveying a document along a conveying path, which is also known as a manuscript jam or a paper jam. Occurrence of a document jam may cause folding or tearing of the document. A scanner can detect a document jam, based on a size of the document conveyed and a conveyance distance of the document.

Patent Literature (PTL) 1 discloses a technique of receiving light reflected by an edge of the document conveyed, thereby detecting the edge of the document using a document read sensor.

CITATION LIST

Patent Literature

[PTL 1] Japanese Patent No. 5211960

SUMMARY

Technical Problem

Conventionally, a sensor for detecting a document size and a sensor for reading the document are separately provided, ending up with an increase in manufacturing cost.

Thus, an object of the present invention is to provide a scanner which properly detects a document size, using a document read sensor.

Solution to Problem

To achieve the above object, a scanner according to one aspect of the present invention is a scanner including: a medium which is conveyed in a first direction along a conveying path; a read unit disposed in a second direction perpendicular to the first direction; a first light emitting unit that emits first light to the read unit across the conveying path; and a detection unit that detects a length of the medium in the second direction, based on information on an intensity of the first light detected in the second direction.

According to this configuration, the scanner can detect a width of a medium based on a position of a portion of the read unit which the emitted light has failed to reach as a result of the emitted light being blocked by the medium. The read unit is disposed in the width direction of the medium perpendicular to the direction of medium conveyance so as to read media. The position of the portion of the read unit which does not receive the emitted light corresponds to the width of the medium which is conveyed. Thus, the scanner can detect the medium width based on the position of the portion of the read unit that does not receive the emitted light, and know the medium size from the medium width using a predetermined relationship therebetween. Thus, the scanner can properly detect the medium size.

For example, the first light emitting unit emits the first light in a manner that a direction in which the first light travels and a direction in which the medium is conveyed form an acute angle.

According to this configuration, the scanner can detect the width of a medium, while reducing its effects on the reading of the medium by the read unit. The light emitting unit is disposed in the manner that the direction in which the light emitted by the light emitting unit travels and the direction of medium conveyance form an acute angle. Thus, the read unit can read the medium as is conventional after the medium width is detected. Thus, the scanner can properly detect the medium size, using the read unit.

For example, the scanner further includes a second light emitting unit disposed along a same side as the read unit relative to the conveying path, wherein the first light emitting unit stops emitting the first light after the detection unit detects the length; the second light emitting unit starts emitting second light to the medium after the detection unit detects the length; and the read unit receives a portion of the second light reflected by the medium, to read the medium, the second light being emitted by the second light emitting unit.

According to this configuration, the scanner can detect a width of a medium to be read, prior to reading the medium, and thereafter read the medium as is conventional. Desirably, the read unit reads the medium, using only the light emitted by the second light emitting unit disposed along the same side as the read unit relative to the conveying path, so that the read unit can more properly read colors of the medium. To that end, the scanner stops the first light emitting unit from emitting light when the read unit reads the medium, allowing the read unit to more properly read an image of the medium.

For example, the detection unit includes a line sensor, and detects the length of the medium in the second direction, based on the information on the intensity of the first light received by the line sensor.

According to this configuration, the scanner can detect the width of the medium based on a position of a portion of the line sensor, included in the read unit, which has received the emitted light or a position of a portion of the line sensor which does not receive the emitted light, as a result of the emitted light being blocked by the medium and consequently failing to reach the portion of the line sensor.

For example, the detection unit detects the length of the medium in the second direction, based on whether the intensity of the first light received by the line sensor is higher than a threshold which is higher than an intensity of a portion of the first light, emitted by the first light emitting unit, which has transmitted through the medium and received by the line sensor, and lower than the first light emitted by the first light emitting unit and received by the line sensor.

According to this configuration, the detection unit can determine, relative to the threshold, an intensity of the light received by the receiver unit, thereby more properly detecting the medium width.

For example, the scanner further includes a third light emitting unit disposed along a same side as the read unit relative to the conveying path, wherein the first light emitting unit includes a reflective unit which reflects, to the detection unit, a portion of third light emitted by the third light emitting unit, to send fourth light, and the detection unit detects an edge of the medium, based on information on an intensity of the fourth light.

According to this configuration, the scanner can properly sense the top edge of the medium, using the read unit mounted on the scanner to read a medium. The read unit senses the top edge of the medium, based on whether the read unit receives the light reflected off the reflective unit. Since the read sensor can detect the top edge of the medium, the scanner is not required to separately mount a medium sensor. Thus, the read sensor can be used also as a medium sensor as well as reducing erroneous detection of the top edge of a medium.

For example, the detection unit senses the edge of the medium, based on information on an intensity of a portion of the third light diffusely reflected by the medium.

According to this configuration, the scanner can properly sense the top edge of a medium, using the read unit mounted thereon to read media. The read unit receives the light diffusely reflected by a medium when reading the medium, whereas receiving the light specularly reflected by the reflective unit if no medium is at the reading location. The detection unit uses this feature to distinguish between the light diffusely reflected by a medium and the light specularly reflected by the reflective unit, and sense the top edge of the medium when a receiver unit 164 in a state for receiving light specularly reflected has changed to a state for receiving light diffusely reflected. The read sensor can detect the top edge of the medium as such. This obviates the need for separately mounting a medium sensor. Thus, the read sensor can be used also as a medium sensor as well as reducing erroneous detection of the top edge of a medium.

For example, the read unit receives light at a first time and a second time later than the first time, and if an intensity of the light received by the read unit at the first time is higher than a threshold and an intensity of the light received by the read unit at the second time is lower than or equal to the threshold, the detection unit detects that passage of the edge at a time between the first time and the second time.

According to this configuration, the scanner senses the top edge of the medium, based on intensities of the light obtained by the receiver unit receiving the light two times. Specifically, if the receiver unit receives the light specularly reflected by the reflective unit at the first time of the two times, and receives the light diffusely reflected by the medium at the second time of the two times, the scanner senses that the top edge of the medium has passed a predetermined position at a time between the two times. This can more precisely reduce erroneous detection of the top edge of a medium.

For example, the scanner further includes a white surface part having a white surface facing the third light emitting unit, disposed along an opposite side to the read unit relative to the conveying path, wherein the third light emitting unit emits the third light to the white surface part if the detection unit detects the edge, and in a state where an opposite surface of the medium to a read surface is facing the white surface part, the read unit receives the portion of the third light diffusely reflected by the medium, to read the medium.

According to this configuration, the scanner reads a medium, using a white surface as a background. This allows the scanner to read colors of the medium more properly.

For example, the reflective unit and the white surface part are disposed side by side along the conveying path, the read unit is further movable along the conveying path, the read unit (i) receives, at a position facing the reflective unit, the portion of the third light reflected by the reflective unit, (ii) moves to a position facing the white surface part if the detection unit detects the edge, and (iii) reads the medium at the position facing the white surface part.

According to this configuration, by moving the read unit, light emission to the reflective unit and to the white surface part can be conducted properly.

For example, the threshold is higher than an intensity of a portion of the third light reflected by the white surface part and received by the read unit, and lower than an intensity of the portion of the third light reflected by the reflective unit and received by the read unit.

According to this configuration, the detection unit determines, relative to the threshold, an intensity of the light received by the receiver unit, thereby more properly detecting an edge of the medium. Thus, the scanner can reduce erroneous detection of the top edge of the medium.

Advantageous Effects

According to the present invention, a scanner which properly detects a document size using a document read sensor is achieved.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 10 is a diagram illustrating correspondence between document width and document size according to the embodiment 1.

FIG. 13 is a cross-sectional view of the scanner according to the embodiment 2, taken along XIII-XIII in FIG. 12.

FIG. 14 is an external view of a scanner according to an embodiment 3.

FIG. 21B is a second schematic diagram illustrating the method for detecting the top edge of the document, performed by the read unit according to the embodiment 3.

FIG. 22 is a schematic diagram illustrating a method for reading a document, performed by the read unit according to the embodiment 3.

DESCRIPTION OF EMBODIMENTS

Hereinafter, embodiments according to the present invention are to be described, with reference to the accompanying drawings. The embodiments described below are each merely preferred illustration of the present invention. Values, shapes, materials, components, arrangement and connection between the components, steps, and the order of the steps described in the following embodiments are merely illustrative and not intended to limit the present invention. The present invention is indicated by the appended claims. Thus, among components of the embodiments below, those not recited in any one of the independent claims are not necessary to achieve the present invention but are described as components for preferable embodiments.

Embodiment 1

In the present embodiment, a scanner which properly detects a document size, using a document read sensor, will be described. The scanner is an ADF scanner which reads documents while sequentially conveying them by ADF. The scanner corresponds to a scanner. A document is also referred to as a medium.

Figure 1:
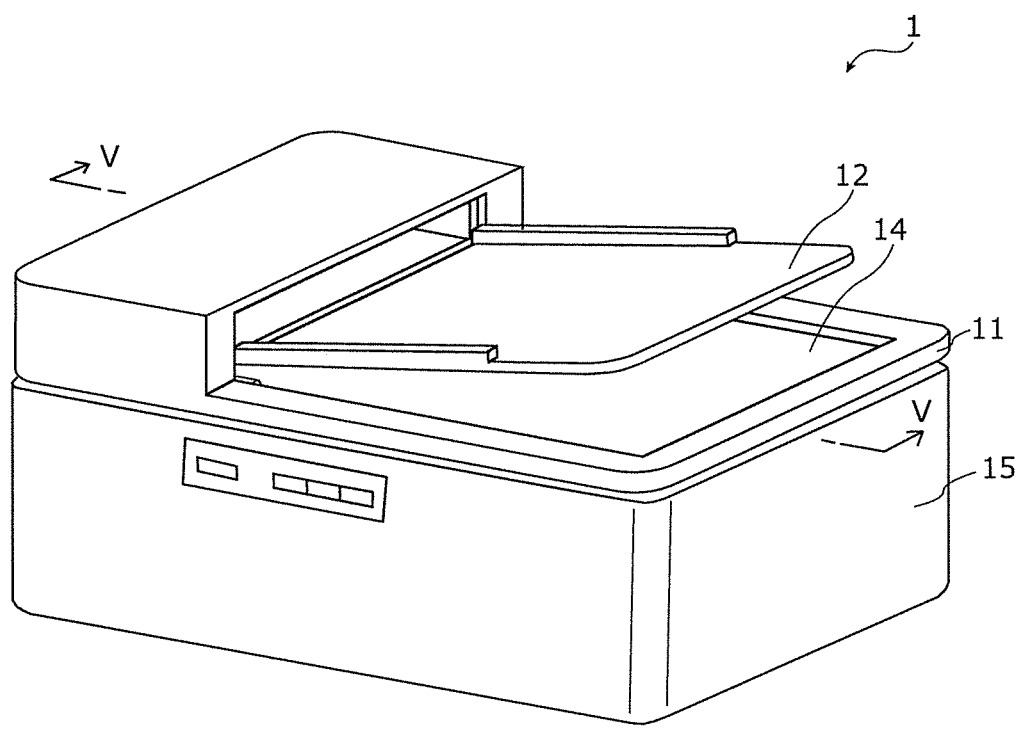
FIG. 1 is an external view of a scanner according to an embodiment 1.
Figure 2:
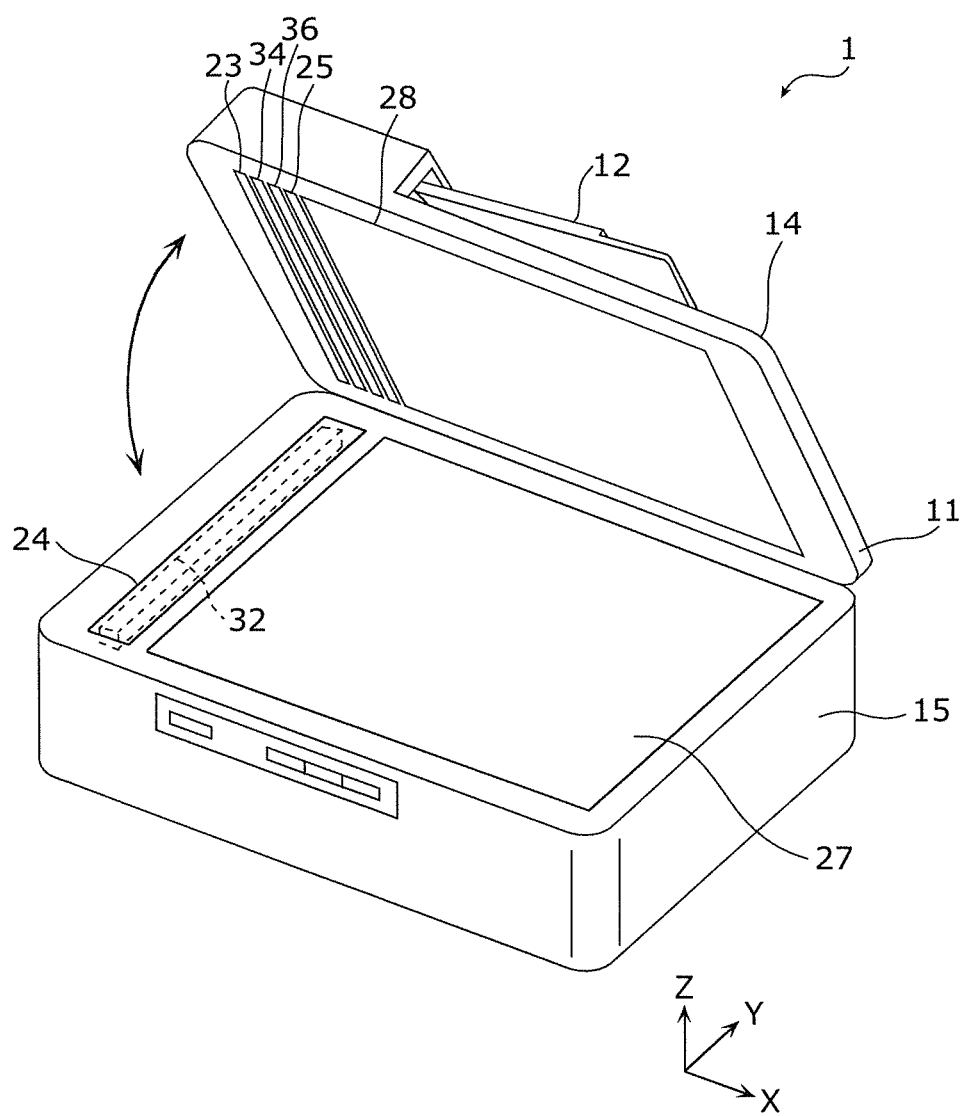
FIG. 2 is an external view of the scanner according to the embodiment 1 with a cover unit open.
Figure 3:
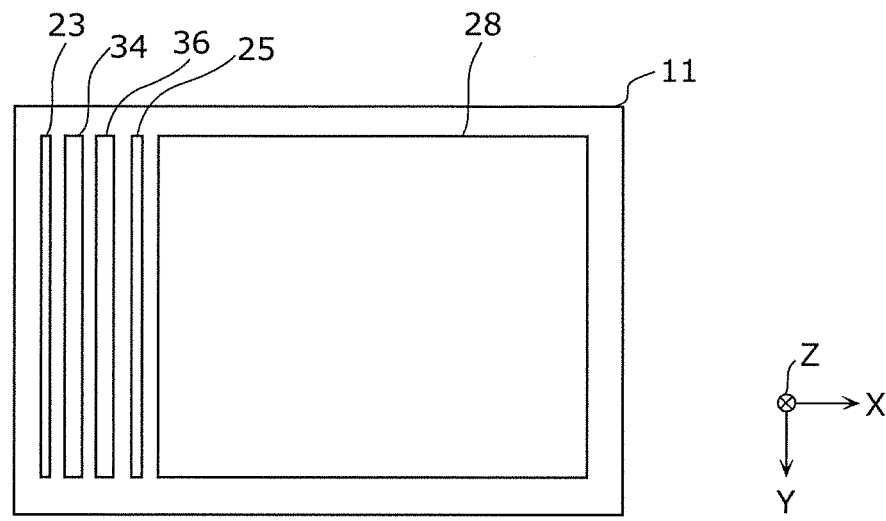
FIG. 3 is a bottom view of the cover unit of the scanner according to the embodiment 1
Figure 4:
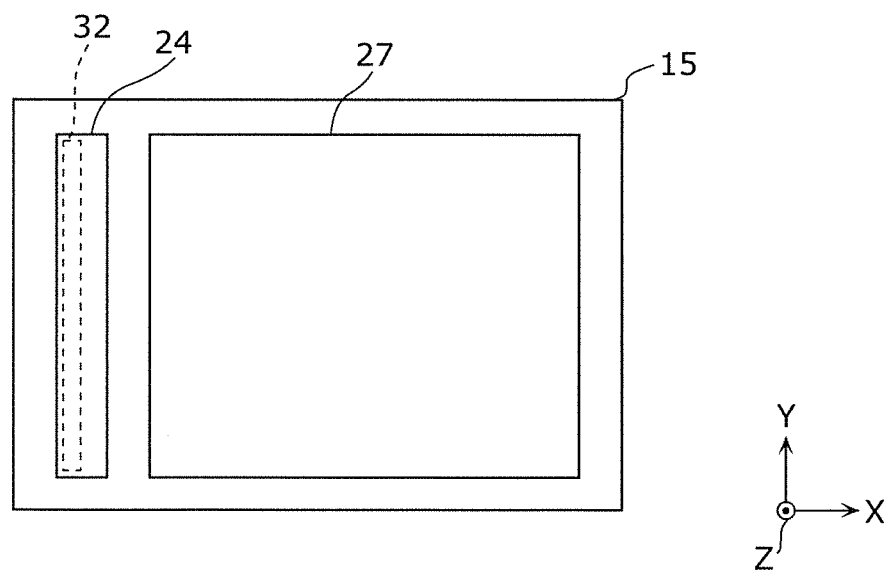
FIG. 4 is a top view of a main unit of the scanner according to the embodiment 1.

FIG. 1 is an external view of the scanner according to the present embodiment. FIG. 2 is an external view of the scanner according to the present embodiment with a cover unit open. FIG. 3 is a bottom view of the cover unit of the scanner according to the present embodiment. FIG. 4 is a top view of a main unit of the scanner according to the present embodiment.

As shown in FIGS. 1 and 2, a scanner 1 includes a cover unit 11 and a main unit 15.

The main unit 15 includes glass platens 24 and 27 and a read unit 32. FIG. 3 shows a view looking above the main unit 15 from positive Z-direction. It should be noted that the positive Z-direction may be referred to as up direction and negative Z-direction may be referred to as down direction.

The read unit 32 is a sensor for reading an image of a document to be read. The read unit 32, specifically, includes a light emitting unit (not shown, corresponding to a light emitting unit 62 described below) which emits light for reading a document, and a receiver unit (not shown, corresponding to a receiver unit 64 described below) which receives light. A portion of the light emitted by the light emitting unit is reflected by the document to be read or a roller 36, and received by the receiver unit. In response to the receipt of the light, the receiver unit outputs a voltage depending on an intensity of the light received. It should be noted that the light emitting unit may also be referred to as a light source B or a second light emitting unit. The light emitted by the light emitting unit is also referred to as second light.

The light emitting unit is achieved by a light source such as a light emitting diode (LED). The light emitting unit may include a light guide onto which the light from the light source incident, or an optical system for condensing or diffusing the light from the light source. The light emitted from the light emitting unit may have any color (a wavelength), including, for example, white.

The receiver unit is achieved by a line image sensor (also, simply referred to as a line sensor), which is an image sensor disposed in a main-scan direction (Y direction). The line sensor, for example, includes a plurality of optical sensors disposed side by side. The read unit 32 is achieved by, for example, a CIS (contact image sensor) image sensor or a CCD (charge coupled device) image sensor.

In the following, description is given, assuming that the line sensor includes the plurality of optical sensors disposed side by side. However, the present invention is not limited to this configuration. Additionally, the description is given, assuming that the lengthwise of the receiver unit is perpendicular to a direction of document conveyance. However, the present invention is not limited to cases where these directions are strictly perpendicular to each other, but including cases where they are substantially perpendicular to each other.

The read unit 32 is movable in a sub-scan direction (X direction). The read unit 32 moves to a position underneath the glass platen 24 to read a document conveyed by ADF. The read unit 32 moves within a region underneath the glass platen 27 to read a document placed on the glass platen 27.

The glass platen 24 is a light transmissive member through which the light emitted by the read unit 32 and its reflected light pass when the read unit 32 reads the document conveyed by ADF.

The glass platen 27 is a light transmissive member through which the light emitted by the read unit 32 and its reflected light pass when the read unit 32 reads the document placed on the glass platen 27. The glass platens 24 and 27 are each made of a transparent glass plate.

The cover unit 11 includes a paper input tray 12, a paper output tray 14, a paper input slit 23, a light emitting unit 34, the roller 36, a paper output slit 25, and a white surface part 28. FIG. 4 shows a view looking underneath the cover unit 11 from the negative Z-direction.

The paper input tray 12 is a tray for placing the document to be read thereon. A plurality of documents may be placed on the paper input tray 12. Documents placed on the paper input tray 12 are conveyed by a conveying unit (not shown) sheet-by-sheet, passing through paper input slit 23 and the paper output slit 25, to the paper output tray 14. A document is read by, for example, the read unit 32 between the paper input slit 23 and the paper output slit 25. The conveying unit is a roller, for example.

The light emitting unit 34 is a light source which emits light to the read unit 32. The light emitting unit 34 is used to detect a length of a document to be read (hereinafter, also referred to as a document width) in a width direction (Y direction) perpendicular to the direction of document conveyance (X direction). The light emitting unit 34, as with the light emitting unit of the read unit 32, includes an LED, a light guide, an optical system, or the like. The light emitting unit 34 may also be referred to as a light source A or a first light emitting unit. The light emitted by the light emitting unit 34 is also referred to as first light. Operation of the light emitting unit 34 will be described in detail below.

The roller 36 is for holding a document conveyed by ADF against the glass platen 24 so that the document does not curl up from the glass platen 24 when the document is read. The roller 36 has a white surface. This allows the read unit 32 to read the document using the white surface as a background, thereby properly reading colors of the document.

The white surface part 28 is a surface used as a background when the read unit 32 reads a document placed on the glass platen 27. The white surface part 28 has a white surface facing the read unit 32 for the same reason as for the roller 36.

The paper output tray 14 is a tray on which a read document is placed.

The scanner 1 also includes a detection unit (not shown). The detection unit detects the document width, based on a position of a portion of the receiver unit in the width direction of the document at which the light emitted toward the receiver unit is blocked by the document.

Figure 5:
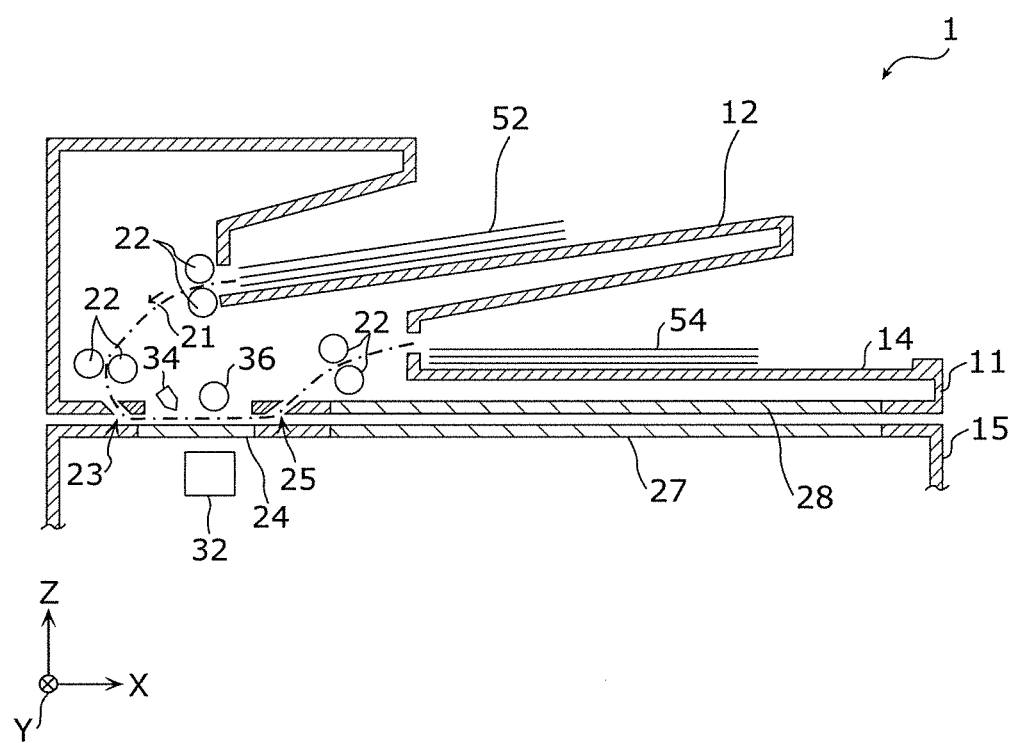
FIG. 5 is a cross-sectional view of the scanner according to the embodiment 1, taken along V-V in FIG. 1.

FIG. 5 is a cross-sectional view of the scanner according to the present embodiment, taken along V-V in FIG. 1.

A conveying path 21 shown in FIG. 5 is a conveying path extending from the paper input tray 12 to the paper output tray 14, along which the document to be read is conveyed by a conveying unit 22. The document is conveyed along the conveying path 21, passing proximate the read unit 32, the light emitting unit 34, etc.

Plural documents 52 are placed on the paper input tray 12 with faces to be read by the scanner 1 up.

The conveying unit 22 feeds one sheet of document of the plural documents 52 placed on the paper input tray 12 by conveying the document along the conveying path 21. One or more of the conveying units 22 are provided so as to convey the document along the conveying path 21.

The paper input slit 23 is an opening through which a document is conveyed from the paper input tray 12. A document having passed through the paper input slit 23 is read while being conveyed proximate the read unit 32, the light emitting unit 34, and the roller 36.

The read unit 32 is provided along one side relative to the conveying path 21. The light emitting unit 34 and the roller 36 are provided along the other side relative to the conveying path 21, the other side being opposite to the side along which the read unit 32 is provided.

The paper output slit 25 is an opening through which the read document is conveyed to the paper output tray 14. A document having passed through the paper output slit 25 is placed on top of a document 54 on the paper output tray 14.

Figure 6:
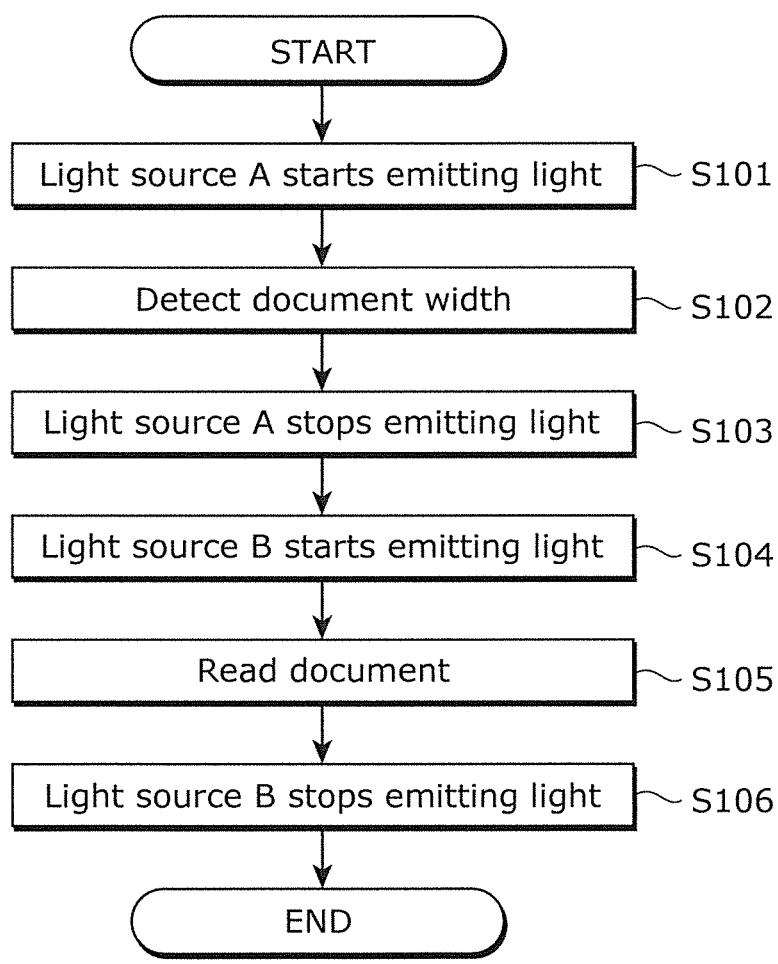
FIG. 6 is a flowchart illustrating a document size detection process performed by the scanner according to the embodiment 1.

FIG. 6 is a flowchart illustrating a document size detection process performed by the scanner according to the present embodiment.

In step S101, the light source A (the light emitting unit 34) starts emitting light. At this point in time, the document to be read has not reached proximate the read unit 32. The conveying unit 22 advances the document to be read along the conveying path.

In step S102, a width of the document to be read is detected. At this point in time, the document to be read has reached proximate the read unit 32. A portion of the light, emitted by the light emitting unit 34, has reached the receiver unit, and the rest of the light is blocked by the document or has transmitted through the document and has reached the receiver unit. Here, the conveying unit 22 may suspend from conveying the document. This is so that the width of the document to be read can be accurately detected.

In step S103, the light source A stops emitting light. This is performed if the document width is detected in step S102.

In step S104, the light source B (the light emitting unit 62) starts emitting light. It should be noted that steps S103 and S104 may be performed concurrently or step S104 may be performed prior to step S103.

In step S105, for example, the read unit 32 reads the document, utilizing the light emitted from the light source B. The conveying unit 22 advances the document along the conveying path.

In step S106, the scanner 1 stops the light source B from emitting light. This is performed after the reading of the document is completed.

Figure 7:
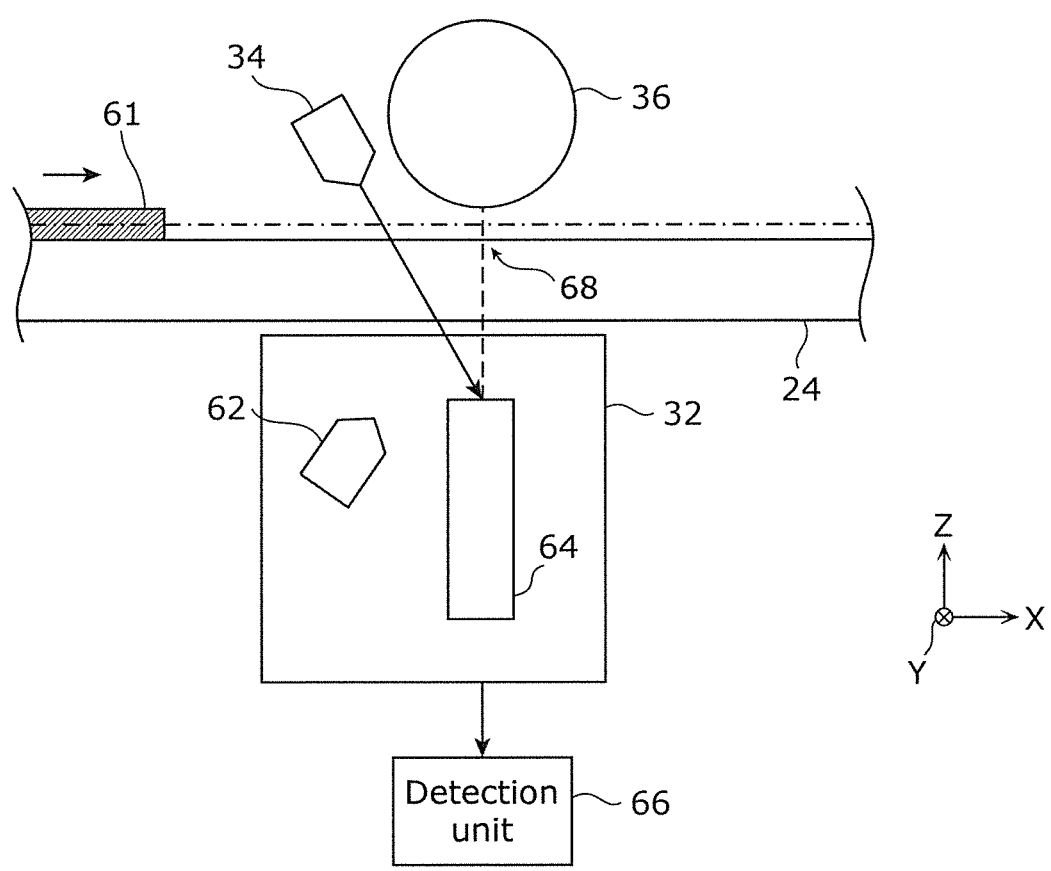
FIG. 7 is a first schematic diagram illustrating a method for detecting a document size according to the embodiment 1.

FIG. 7 is a first schematic diagram illustrating the method for detecting the document size according to the present embodiment. FIG. 7 shows positional relationship between the document and the read unit 32 and so on and states of operation of the read unit 32 and so on in step S101 of FIG. 6.

As shown in FIG. 7, the read unit 32 includes the light emitting unit 62 and the receiver unit 64.

The light emitting unit 62 is disposed at a proper angle at a proper position for emitting light to a predetermined position on the conveying path.

The receiver unit 64 receives light and outputs a voltage depending on an intensity of the light received. Specifically, the receiver unit 64 outputs a greater voltage for a higher intensity of the light received. The receiver unit 64 is disposed at a proper angle at a proper position for receiving a portion of the light, emitted by the light emitting unit 62, which has been reflected (diffusely reflected) by the document. Specifically, the receiver unit 64 reads the document 61 by reading colors of a document 61 at a predetermined reading location 68 on the conveying path.

A detection unit 66 detects the document width, based on a position, of a portion of the receiver unit 64 in the width direction of the document, at which the emitted light is blocked by the document. Specifically, the detection unit 66 detects, as the width of the document 61, a length of the document in the direction (Y direction) perpendicular to the direction of document conveyance (X direction), based on a position of a portion of the receiver unit 64 that has received the emitted light or a position of a portion of the receiver unit 64 that has received a portion of the emitted light that has transmitted through the document 61. It should be noted that the direction of document conveyance may also be referred to as a first direction and a direction perpendicular to the first direction in a plane parallel to a document surface is also referred to as a second direction.

Specifically, the detection unit 66 obtains the voltage output by the receiver unit 64 in response to the receipt of light. Then, the detection unit 66 determines that the emitted light has been received by the receiver unit 64 if the obtained voltage is greater than a predetermined threshold. The detection unit 66 determines that the emitted light is not received by the receiver unit 64 if the obtained voltage is less than or equal to the threshold. Herein, the case where the emitted light is not received by the receiver unit 64 includes a case where the emitted light is blocked by the document 61 and consequently the receiver unit 64 receives no light, and a case where the emitted light transmits through the document 61 and consequently the receiver unit 64 receives the transmitted light having a lower intensity than the emitted light.

The threshold is set properly to be a value that is lower than the intensity of the emitted light received by the receiver unit 64 and higher than the intensity of the transmitted light received by the receiver unit 64.

The detection unit 66 detects the width of the document 61, based on the number of optical sensors, among the plurality of optical sensors included in the receiver unit 64, which have received the emitted light as a result of a portion of the emitted light being blocked by the document 61. It should be noted that, at this time, the detection unit 66 can, alternatively, detect the width of the document 61 based on the number of optical sensors excluding those that have received the emitted light.

The light emitting unit 34 is disposed at a proper angle at a proper position for emitting light to the receiver unit 64. Specifically, the light emitting unit 34 is disposed such that the direction in which light emitted by the light emitting unit 34 travels and the direction of conveyance of the document 61 form an acute angle. In doing so, the detection unit 66 can detect the width of the document 61 and the read unit 32 can thereafter read an image of the document 61, without the read unit 32 moving.

The light emitting unit 34 emits the light to the receiver unit 64. The document 61 has not reached a position above the read unit 32, and thus does not block the light emitted by the light emitting unit 34. The receiver unit 64 receives the light emitted by the light emitting unit 34. Here, the optical sensors included in the receiver unit 64 receive the light emitted by the light emitting unit 34, without obstruction by the document 61. Consequently, the optical sensors each output a voltage exceeding the threshold.

The detection unit 66 obtains the voltages output by the optical sensors included in the receiver unit 64 and determines that the document 61 has not reached a position above the read unit 32 yet, from a fact that the obtained voltages exceed the threshold. Thus, at this point in time, the detection unit 66 does not detect the width of the document 61.

Figure 8:
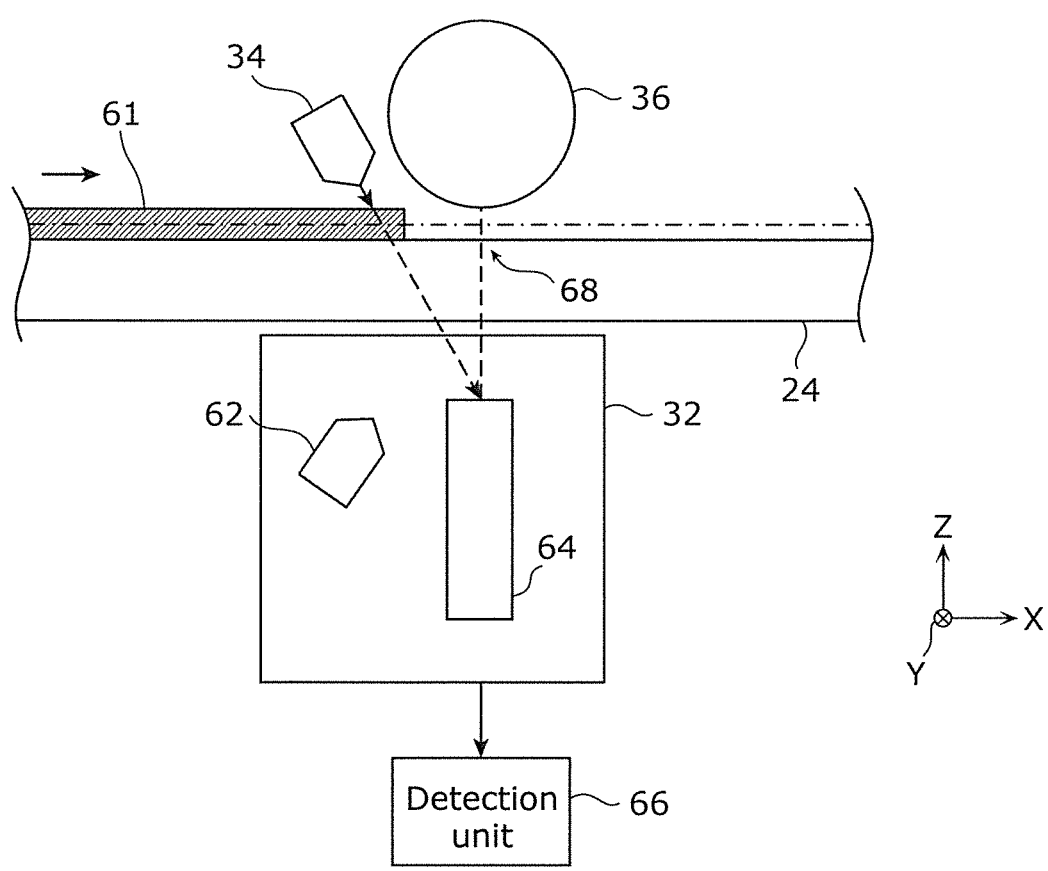
FIG. 8 is a second schematic diagram illustrating the method for detecting the document size according to the embodiment 1.

FIG. 8 is a second schematic diagram illustrating the method for detecting the document size according to the present embodiment. FIG. 8 shows positional relationship between the document and the read unit 32 and so on and states of operation of the read unit 32 and so on in step S102 of FIG. 6.

As shown in FIG. 8, the light emitting unit 34 emits light to the receiver unit 64, as with FIG. 7. The document 61 is conveyed by the conveying unit 22, having reached a position to block a portion of the emitted light. However, the document 61 has not reached the reading location 68 yet. The detection unit 66 detects the width of the document 61 as follows, while an edge of the document 61 ahead in the forward direction of document conveyance is behind the reading location 68 in the direction of document conveyance.

Some of the optical sensors included in the receiver unit 64 can receive the emitted light while, on the contrary, the remaining optical sensors cannot since the document 61 is blocking the emitted light. It should be noted that the remaining optical sensors receive no light if the document 61 is impervious to light. On the other hand, if the document 61 is permeable to a portion of light, the remaining optical sensors receive transmitted light that has a lower intensity than the emitted light. Thus, the some optical sensors output voltages greater than the threshold whereas the remaining optical sensors output voltages lower than the threshold.

The detection unit 66 obtains the voltages output by the plurality of optical sensors included in the receiver unit 64. Then, the detection unit 66 recognizes that the document is present above the read unit 32 due to a fact that some of the voltages obtained are greater than the threshold while the rest of the voltages are lower than the threshold.

In this case, the detection unit 66 detects the width of the document 61, based on the number of optical sensors that have output voltages greater than the threshold or based on the number of optical sensors that have output voltages less than or equal to the threshold.

Figure 9:
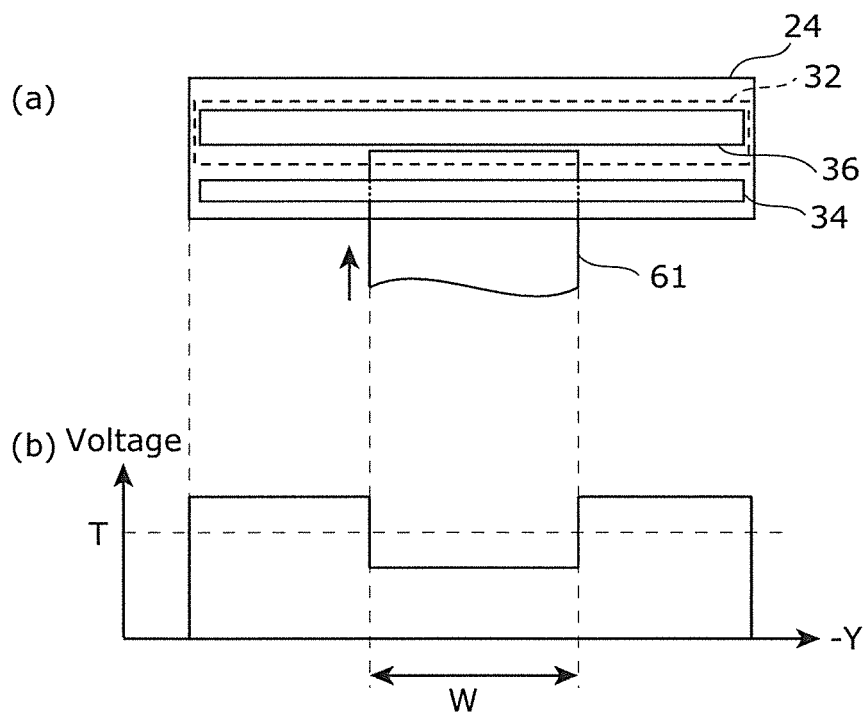
FIG. 9 is a diagram illustrating processing for detecting a document width from an intensity of light received by a receiver unit according to the embodiment 1.

FIG. 9 is a diagram illustrating processing for detecting the document width from an intensity of the light received by the receiver unit according to the present embodiment. Part (a) of FIG. 9 is a top view of a portion of the main unit 15, including the glass platen 24, in the positional relationship in step S102 of FIG. 6.

As shown in (a) of FIG. 9, the document 61 has been conveyed, passed underneath the light emitting unit 34, and approached a position above the read unit 32.

Part (b) of FIG. 9 depicts voltages output by the plurality of optical sensors included in the receiver unit 64 in the positional relationship illustrated in (a) of FIG. 9. The direction (Y direction) in which the optical sensors are disposed side by side is indicated on the horizontal axis and the voltages are indicated on the vertical axis.

As shown in (b) of FIG. 9, among the plurality of optical sensors, optical sensors that are at positions where the emitted light is blocked by the document 61 output lower voltages than a threshold T, whereas the other optical sensors at the other positions output voltages greater than the threshold T. The detection unit 66 detects a document width W (the width in Y direction), based on the number of optical sensors that have output the voltages less than the threshold. It is apparent from (b) of FIG. 9 that the detection unit 66 can, alternatively, detect the document width W, based on the number of optical sensors that have output the voltages greater than the threshold.

FIG. 10 is a diagram illustrating a correspondence chart T10 between a document width and a document size according to the present embodiment. In the correspondence chart T10, predetermined types of papers and lengths of sides of the papers (the vertical length and the horizontal length) are corresponded.

If detected the document width in step S102, the detection unit 66 determines whether the document width matches any one of the lengths of the sides indicated in the correspondence chart T10. Then, if the document width matches any one of the lengths, the detection unit 66 may determine the document 61 to be of a corresponding paper type of the matched length.

For example, if the detection unit 66 detects the document width of 210 mm in step S102, the detection unit 66 may determine the paper type of the document 61 to be "A4." Additionally, the detection unit 66 may detect the length of the other side (the length of the document in the direction of document conveyance) of the document to be 297 mm.

It should be noted that, considering a reading error, the determination as to whether the document width W matches any one of the lengths of the sides in the correspondence chart T10 may permit an error within about a few percent. Alternatively, even if the document width W matches none of the lengths in the correspondence chart T10, a length having a smallest difference from the document width W or a length having a difference within a predetermined permissible range in the correspondence chart T10 may be determined to be the document size.

Figure 11:
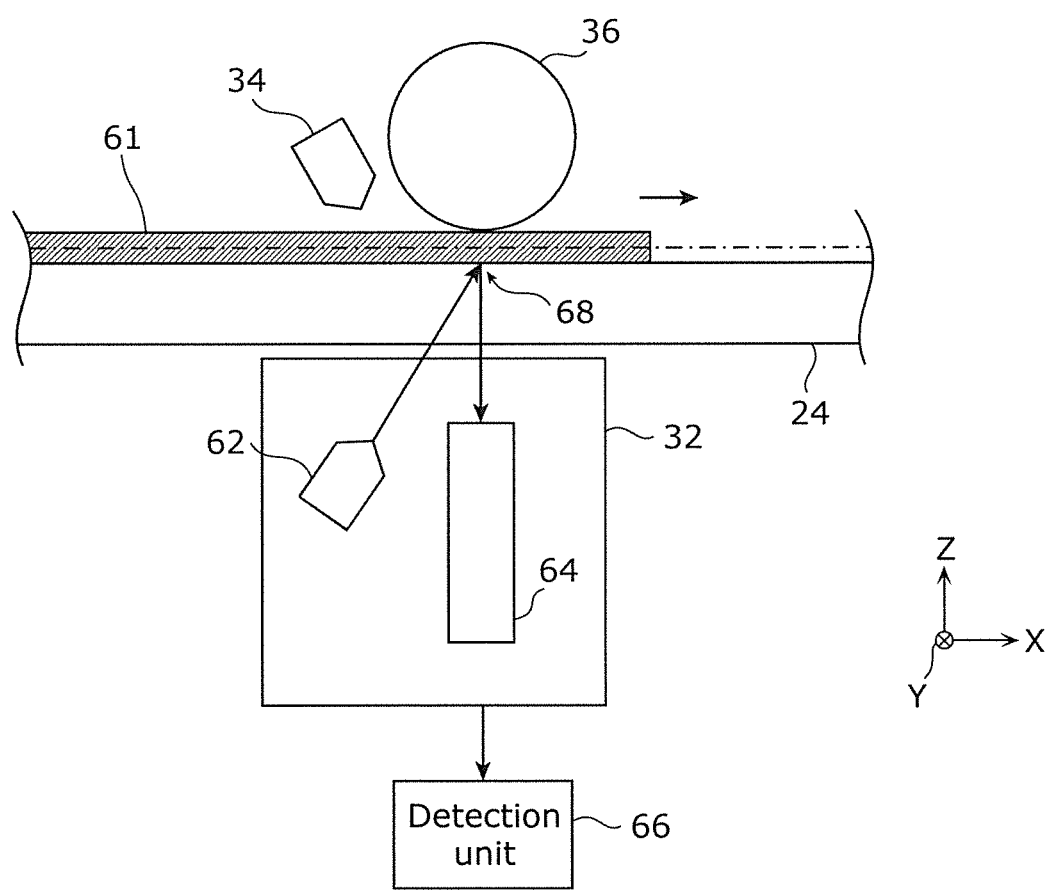
FIG. 11 is a third schematic diagram illustrating the method for detecting the document size according to the embodiment 1.

FIG. 11 is a third schematic diagram illustrating the method for detecting the document size according to the present embodiment. FIG. 11 shows positional relationship between the document and the read unit 32 and so on and states of operation of the read unit 32 and so on in step S105 of FIG. 6.

The light emitting unit 62 emits the light for reading the document. The document 61 is conveyed by the conveying unit 22 and a portion of which is on the reading location 68. In other words, the figure shows a state in which the edge of the document 61 ahead in the forward direction of document conveyance has already passed the reading location 68. The document 61 reflects (diffusely reflects) a portion of the light emitted by the light emitting unit 62. The receiver unit 64 receives the portion of the light, emitted by the light emitting unit 62, which has been reflected by the document 61.

The portion of the light reflected by the document 61 mirrors the colors of the document 61. The receiver unit 64 can read a read surface of the document 61 by reading the conveyed document 61 line by line.

The scanner 1 is configured to detect a document jam, taking into account the length of the document in the direction of document conveyance detected by the detection unit 66. Specifically, if the edge of the document ahead in the forward direction of document conveyance has passed above the read unit 32 and then the document has been conveyed by the length of the document in the direction of document conveyance, and the document is still remaining above the read unit 32, the scanner 1 may determine that a document jam is occurring on the conveying path.

As described above, the scanner according to the present embodiment can detect a width of a document based on a position of a portion of the line sensor, included in the document read sensor, which the emitted light has failed to reach as a result of the emitted light being blocked by the document. The document read sensor is disposed in the width direction of the document perpendicular to the direction of document conveyance so as to read documents. The positions of the optical sensors forming the line sensor which do not receive the emitted light correspond to the width of the document which is conveyed. Thus, the scanner can detect the document width based on the positions of the optical sensors that do not receive the emitted light, and know the document size from the document width using a predetermined relationship therebetween. Thus, the scanner can properly detect the document size, using the document read sensor.

Moreover, the scanner detects the width of a document, while reducing its effects on the reading of the document by the read unit. Desirably, when the read unit reads a document, the linear sensor receives light used only for reading the document. If the document width is detected while the top edge of the document is behind the reading location, the read unit can thereafter read the document as is conventional. Thus, the scanner can properly detect the document size, using the document read sensor.

Moreover, the scanner detects the width of a document, while reducing its effects on the reading of the document by the read unit. The light emitting unit is disposed in the manner that the direction in which the light emitted by the light emitting unit travels and the direction of document conveyance form an acute angle. Thus, even if the read unit is fixed relative to the conveying unit, the read unit can read the document as is conventional after the document width is detected. Thus, the scanner can properly detect the document size, using the document read sensor.

Moreover, the scanner can detect a width of a document to be read, prior to reading the document, and thereafter read the document as is conventional. Desirably, the read unit reads the document, using only the light emitted by the second light emitting unit disposed along the same side as the read unit relative to the conveying path so that the read unit can more properly read colors of the document. To that end, the scanner stops the first light emitting unit from emitting light when the read unit reads the document, allowing the read unit to more properly read an image of the document.

Moreover, the scanner can detect the width of the document based on a position of a portion of the line sensor, included in the document read sensor, which has received the emitted light or a position of a portion of the line sensor which does not receive the emitted light, as a result of the emitted light being blocked by the document and consequently failing to reach the portion of the line sensor.

Moreover, the detection unit can determine, relative to the threshold, an intensity of the light received by the receiver unit, thereby more properly detecting the document width.

Embodiment 2

In the present embodiment, a scanner which properly detects a document size using a document read sensor, will be described. The scanner is an ADF scanner which reads documents while sequentially conveying them by ADF from the rear side of the scanner to the front side.

Figure 12:
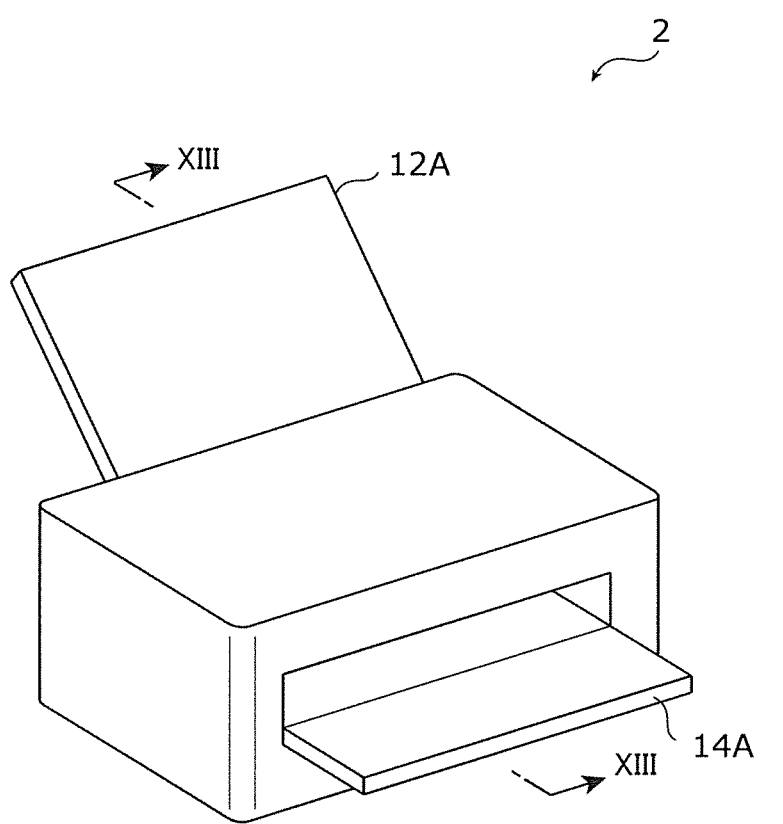
FIG. 12 is an external view of a scanner according to an embodiment 2.

FIG. 12 is an external view of the scanner according to the present embodiment. FIG. 13 is a cross-sectional view of the scanner according to the present embodiment, taken along XIII-XIII in FIG. 12.

As shown in FIGS. 12 and 13, a scanner 2 includes a paper input tray 12A, a paper output tray 14A, a conveying unit 22A, a read unit 32A, a light emitting unit 34A, and a roller 36A. The components referred to by the same reference signs as those according to the embodiment 1 will be described, focusing on different functionality. Descriptions of the same features as the embodiment 1 are omitted.

The paper input tray 12A is a tray for placing a document to be read thereon. The paper input tray 12A is provided on the rear side of the scanner 2. A plurality of documents may be placed on the paper input tray 12A.

The paper output tray 14A is a tray on which a read document is placed. The paper output tray 14A is provided on the front side of the scanner 2.

The conveying unit 22A feeds one sheet of document of documents placed on the paper input tray 12 by conveying the document along a conveying path 21A. The conveying path 21A is a substantially linear path extending from the paper input tray 12A provided on the rear side of the scanner 2 to the paper output tray 14A provided on the front side of the scanner 2.

The read unit 32A is provided along one side relative to the conveying path 21A. The light emitting unit 34A and the roller 36A are provided along the other side relative to the conveying path 21A, the other side being opposite to the side along which the read unit 32A is provided.

As described above, according to the present invention, even an ADF scanner which has the linear conveying path can properly detect a document size, using the document read sensor.

While the scanner according to the embodiment of the present invention has been described above, the present invention is not limited to the embodiment.

Some or the whole of the embodiment described above can also, but not limited to, be described as follows:

(1) A scanner including: a conveying unit which conveys a document to be read along a conveying path; a read unit for reading an image of the document, the read unit including a line sensor in a width direction of the document, the direction being perpendicular, in a plane parallel to a document surface of the document, to a direction in which the document is conveyed; a first light emitting unit which emits light to the read unit, the first light emitting unit being disposed in the width direction and along an opposite side to the read unit relative to the conveying path; and a detection unit which detects a length of the document in the width direction, based on a position, in the width direction, of a portion of the line sensor, at which the light emitted is blocked by the document.

(2) The scanner according to (1), wherein the read unit reads the document by sequentially reading a portion of the light reflected at a position of a portion of the document conveyed, the position being at a predetermined reading location on the conveying path, and the detection unit detects the length of the document in the width direction while an edge of the document ahead in the forward direction of document conveyance is behind the reading location.

(3) The scanner according to (2), wherein the first light emitting unit emits the light in a manner that the direction in which the emitted light travels and the direction of document conveyance form an acute angle.

(4) The scanner according to (2) or (3), further includes a second light emitting unit which emits light to the document conveyed after the detection unit detects the length, the second light emitting unit being disposed along the same side as the read unit relative to the conveying path, wherein the first light emitting unit stops emitting the light after the detection unit detects the length, and the read unit reads the document by receiving, by the line sensor, the portion of the light, emitted by the second light emitting unit, which has been reflected by the document.

(5) The scanner according to any of (1) to (4), wherein the detection unit detects the length of the document in the width direction, based on a position of a portion of the line sensor which has received the light emitted or a position of a portion of the line sensor, excluding the portion of the line sensor which has received the light emitted.

(6) The scanner according to any of (1) to (5), wherein the detection unit detects the length of the document in the width direction, based on whether an intensity of the light received by the line sensor is higher than a threshold which is higher than an intensity of a portion of the light, emitted by the first light emitting unit, which has transmitted through the document, and lower than an intensity of the light emitted by the first light emitting unit and received by the line sensor.

According to the above-described (1), the scanner can detect the width of the document based on the position of the portion of the line sensor, included in the document read sensor, which the emitted light has failed to reach as a result of the emitted light being blocked by document. The document read sensor is disposed in the width direction perpendicular to the direction of document conveyance so as to read the document. The position of the portion of the line sensor included in the document read sensor, which does not receive the emitted light corresponds to the width of the document which is conveyed. Thus, the scanner can detect the width of the document based on positions of the optical sensors that do not receive the emitted light, and know a document size from the document width using a predetermined relationship therebetween. Thus, the scanner can properly detect the document size, using the document read sensor.

According to the above-described (2), the scanner detects the document width, while reducing its effects on the reading of the document by the read unit. Desirably, when the read unit reads a document, the linear sensor receives light used only for reading the document. If the document width is detected while the top edge of the document is behind the reading location, the read unit can thereafter read the document as is conventional. Thus, the scanner can properly detect the document size, using the document read sensor.

According to the above-described (3), the scanner detects the document width, while reducing its effects on the reading of the document by the read unit. The light emitting unit is disposed in a manner that the direction in which the light emitted by the light emitting unit travels and the direction of document conveyance form an acute angle. Thus, even if the read unit is fixed relative to the conveying unit, the read unit can read the document as is conventional after the document width is detected. Thus, the scanner can properly detect the document size, using the document read sensor.

According to the above-described (4), the scanner can detect a width of a document to be read, prior to reading the document, and thereafter read the document as is conventional. Desirably, the read unit reads the document, using only the light emitted by the second light emitting unit disposed along the same side as the read unit relative to the conveying path so that the read unit can more properly read colors of the document. To that end, the scanner stops the first light emitting unit from emitting light when the read unit reads the document, allowing the read unit to more properly read an image of the document.

According to the above-described (5), the scanner can detect the width of the document based on a position of a portion of a line sensor which has received the emitted light or a position of a portion of the line sensor which does not receive the emitted light, as a result of the emitted light being blocked by the document and consequently failing to reach the portion of the line sensor included in the document read sensor.

According to the above-described (6), the detection unit determines, relative to the threshold, an intensity of the light received by the receiver unit, thereby more properly detecting the document width.

Embodiment 3

In the present embodiment, a scanner which properly detects a size of a document using a document read sensor, and uses the document read sensor also as a document sensor as well as reducing erroneous detection of the top edge of the document, will be described. It should be noted that the scanner may be achieved independently as a scanner which uses the document read sensor also as the document sensor as well as reducing an erroneous detection of the top edge of a document.

The scanner is an ADF scanner which reads documents while sequentially passing them by ADF.

Figure 15:
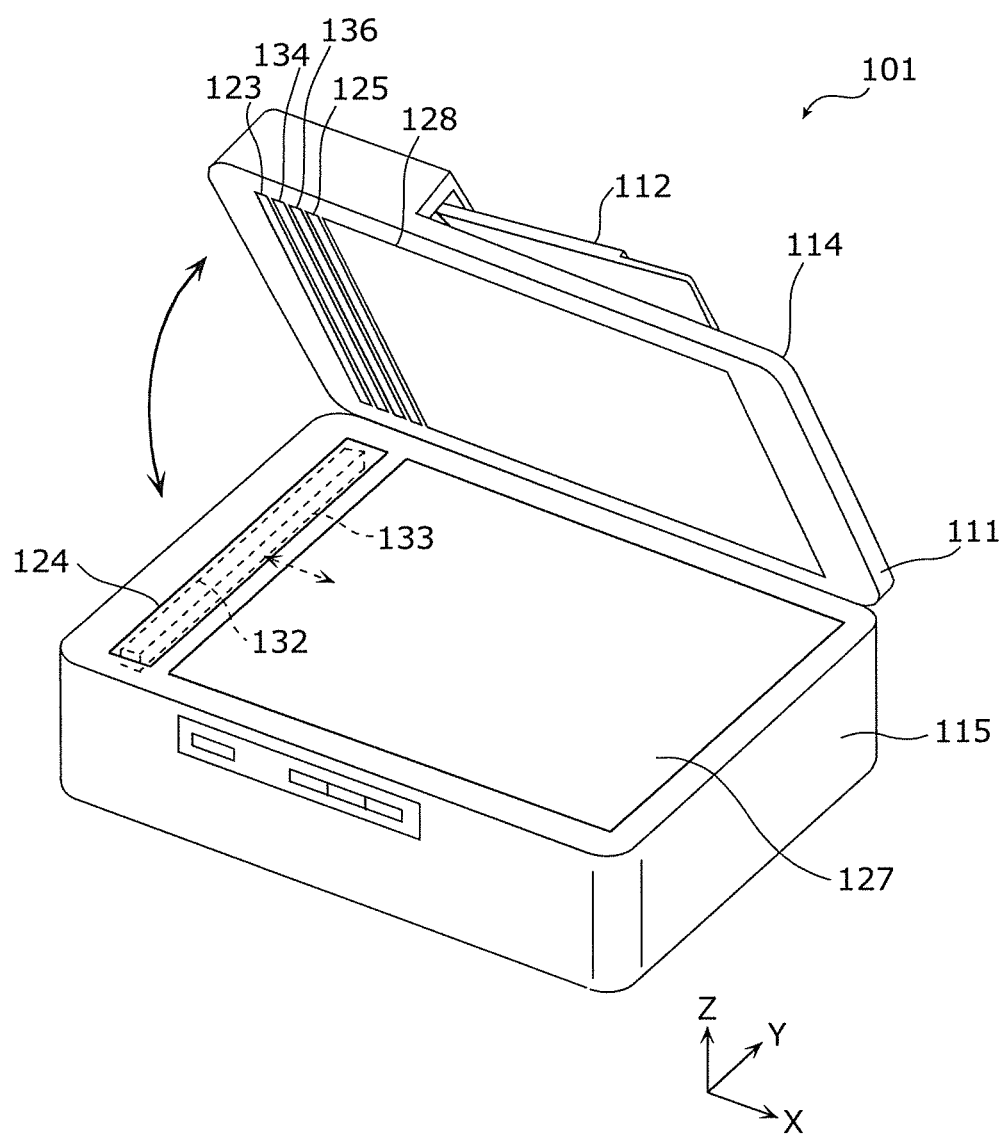
FIG. 15 is an external view of the scanner according to the embodiment 3 with a cover unit open.
Figure 16:
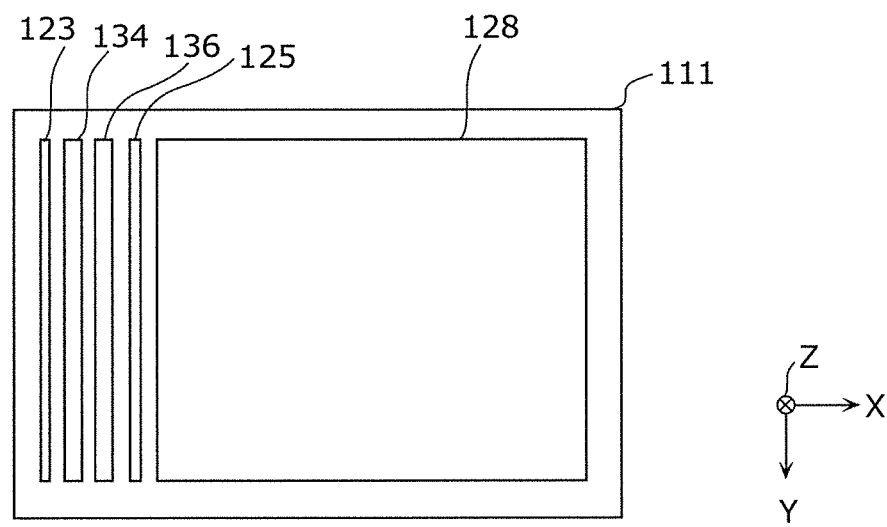
FIG. 16 is a bottom view of the cover unit of the scanner according to the embodiment 3.
Figure 17:
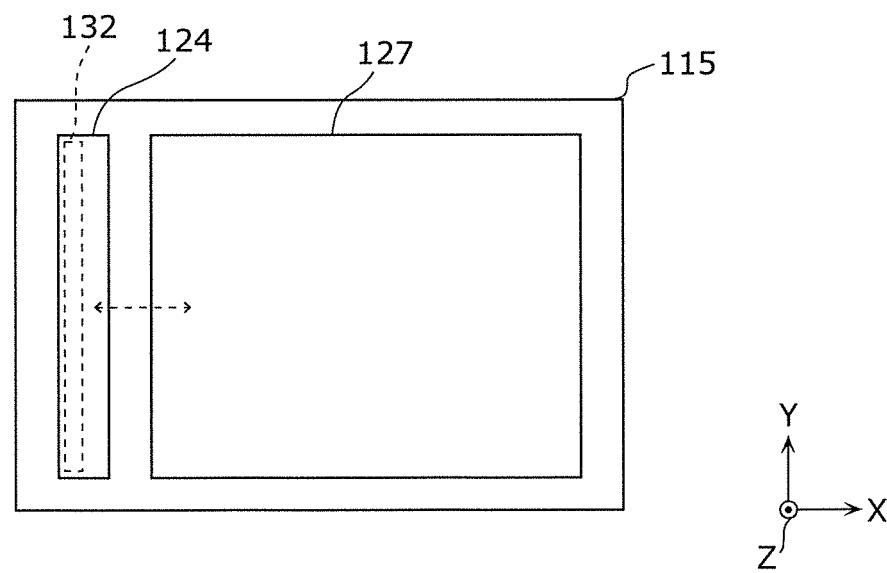
FIG. 17 is a top view of a main unit of the scanner according to the embodiment 3.

FIG. 14 is an external view of the scanner according to the present embodiment. FIG. 15 is an external view of the scanner according to the present embodiment with a cover unit open. FIG. 16 is a bottom view of the cover unit of the scanner according to the present embodiment. FIG. 17 is a top view of a main unit of the scanner according to the present embodiment.

As shown in FIGS. 14 and 15, a scanner 101 includes a cover unit 111 and a main unit 115.

The main unit 115 includes glass platens 124 and 127, a read unit 132, and a moving unit 133. FIG. 16 shows a view looking above the main unit 115 from positive Z-direction. It should be noted that the positive Z-direction may be referred to as up direction and negative Z-direction may be referred to as down direction.

The read unit 132 is a sensor for reading a document to be read. The read unit 132, specifically, includes a light emitting unit (not shown, corresponding to a light emitting unit 162 described below) which emits light for reading the document, and a receiver unit (not shown, corresponding to a receiver unit 164 described below) which receives a reflected portion of the light emitted by the light emitting unit. A portion of the light emitted by the light emitting unit is reflected by the document to be read, or a reflective unit 134 or a white surface part 136 of the cover unit 111, and received by the receiver unit. In response to the receipt of the light, the receiver unit outputs a voltage depending on an intensity of the light received.

The light emitting unit is achieved by a light source such as a light emitting diode (LED). The light emitting unit may include a light guide onto which the light from the light source incident, or an optical system for condensing or diffusing the light from the light source. The light emitted from the light emitting unit may have any color (a wavelength), including, for example, white.

The receiver unit is achieved by a line image sensor, which is an image sensor aligned in a main-scan direction (Y direction). The read unit 132 is achieved by, for example, a contact image sensor (CIS) unit.

The read unit 132 is mounted on the moving unit 133 and movable along with a movement of the moving unit 133. The read unit 132 moves to a position underneath the glass platen 124 to read a document conveyed by ADF. The read unit 132 moves within a region underneath the glass platen 127 to read a document placed on the glass platen 127.

The moving unit 133 is a carriage which moves in a sub-scan direction (X direction). The moving unit 133 has the read unit 132 mounted thereon and moves to change place of the read unit 132 to a position so that the read unit 132 can properly read a document.

The glass platen 124 is a light transmissive member through which the light emitted by the read unit 132 and its reflected light pass when the read unit 132 reads the document conveyed by ADF.

The glass platen 127 is a light transmissive member through which the light emitted by the read unit 132 and its reflected light pass when the read unit 132 reads the document placed on the glass platen 127. The glass platens 124 and 127 are each made of a transparent glass plate.

The cover unit 111 includes a paper input tray 12, a paper output tray 114, a paper input slit 123, the reflective unit 134, a white surface part 36, a paper output slit 125, and a white surface part 128. FIG. 17 shows a view looking underneath the cover unit 111 from the negative Z-direction.

The paper input tray 112 is a tray for placing the document to be read thereon. A plurality of documents may be placed on the paper input tray 112. Documents placed on the paper input tray 112 are conveyed by a conveying unit (not shown) sheet-by-sheet, passing through paper input slit 123 and the paper output slit 125, to the paper output tray 114. A document is read by, for example, the read unit 132 between the paper input slit 123 and the paper output slit 125. The conveying unit is a roller, for example.

The reflective unit 134 is a reflective member which reflects, to the receiver unit, a portion of the light emitted by the light emitting unit. The reflective unit 134 is used to detect the top edge of the document to be read. Desirably, the reflective unit 134, but not limited to, specularly reflects light. The reflective unit 134 is made of, for example, a mirror, or a metal or a stone that is finely polished (mirror finished). Operation of the reflective unit 134 will be described in detail below. The reflective unit 134 corresponds to a first light emitting unit.

The white surface part 136 is a surface used as a background when a document conveyed by ADF is read. The white surface part 136 has a white surface facing the read unit 132. This allows the read unit 132 to properly read colors of the document.

The white surface part 128 is a surface used as a background when the read unit 132 reads a document placed on the glass platen 127. The white surface part 128 has a white surface facing the read unit 132 for the same reason as for the white surface part 136.

The paper output tray 114 is a tray on which a read document is placed.

Figure 18:
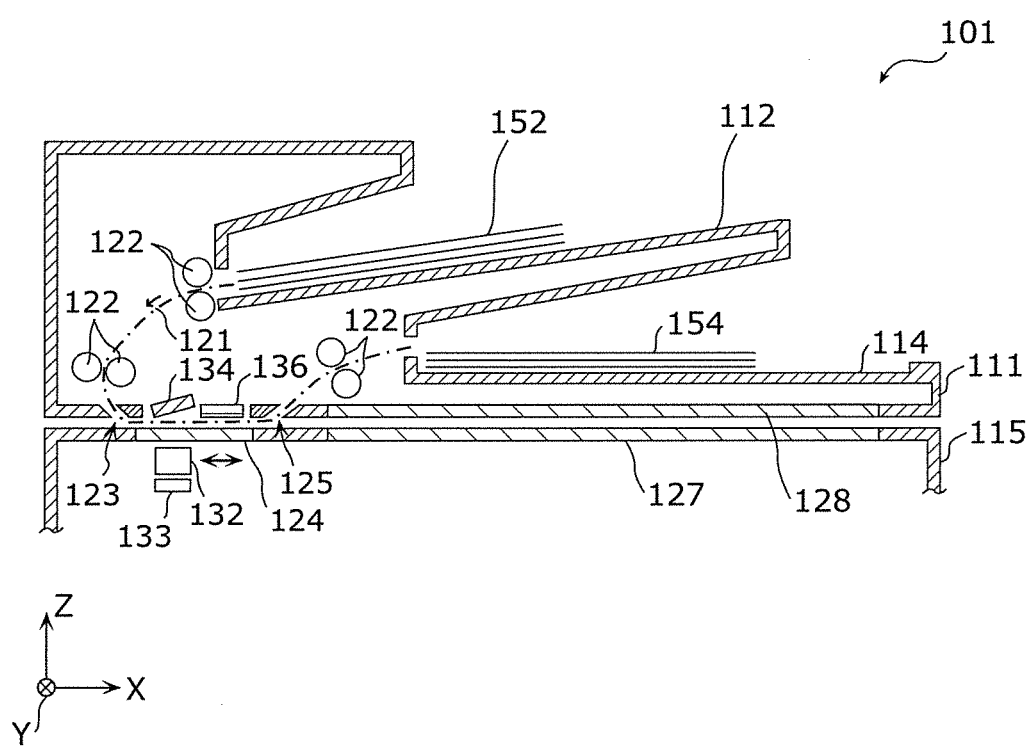
FIG. 18 is a cross-sectional view of the scanner according to the embodiment 3, taken along XVIII-XVIII in FIG. 14.

FIG. 18 is a cross-sectional view of the scanner according to the present embodiment, taken along XVIII-XVIII in FIG. 14.

A conveying path 121 shown in FIG. 18 is a conveying path extending from the paper input tray 112 to the paper output tray 114, along which the document to be read is conveyed by a conveying unit 122. The document is conveyed along the conveying path 121, passing proximate the read unit 132, the reflective unit 134, etc.

Plural documents 152 are placed on the paper input tray 112 with faces to be read up.

The conveying unit 122 feeds one sheet of document of the plural documents 152 placed on the paper input tray 112 by conveying the document along the conveying path 121. One or more of the conveying units 122 are provided so as to convey the document along the conveying path 121.

The paper input slit 123 is an opening through which a document is conveyed from the paper input tray 112. A document having passed through the opening is read while being conveyed proximate the read unit 132, the reflective unit 134, and the white surface part 136.

The read unit 132 is provided along one side relative to the conveying path 121. The reflective unit 134 and the white surface part 136 are provided along the other side relative to the conveying path 121, the other side being opposite to the side along which the read unit 132 is provided.

The paper output slit 125 is an opening through which the read document is conveyed to the paper output tray 114. A document having passed through the paper output slit 125 is placed on a document 154 on the paper output tray 114.

Figure 19:
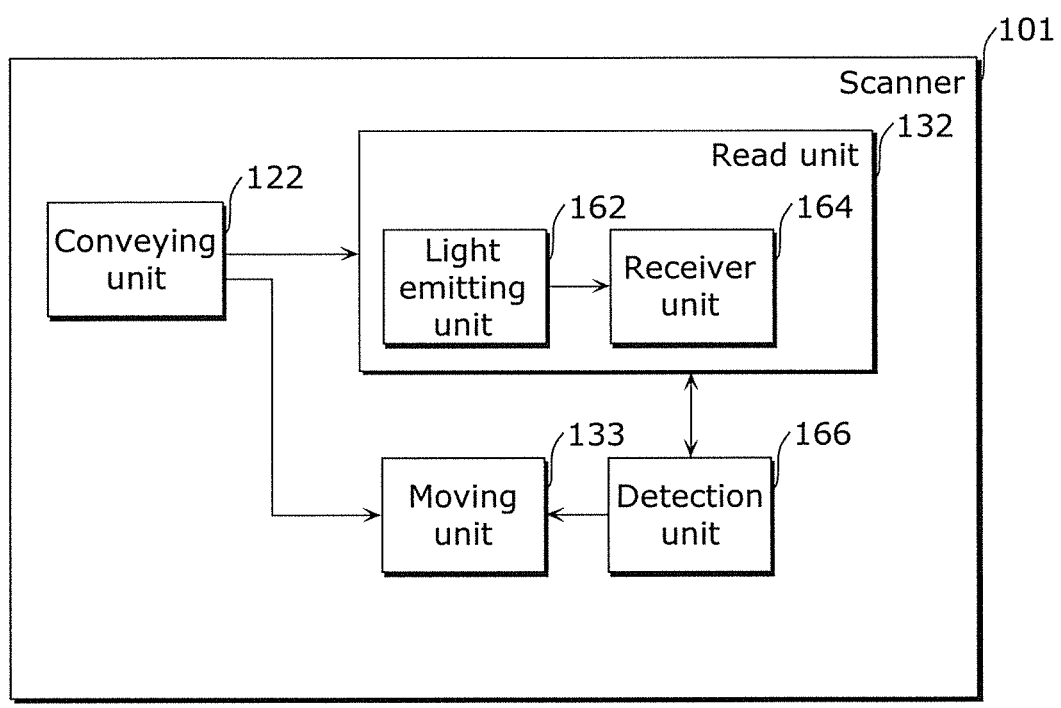
FIG. 19 is a functional block diagram of the scanner according to the embodiment 3.

FIG. 19 is a functional block diagram of the scanner according to the present embodiment.

As shown in FIG. 19, the scanner 101 includes the conveying unit 122, the read unit 132, the moving unit 133, and a detection unit 166. The read unit 132 includes a light emitting unit 162 and a receiver unit 164. The light emitting unit 162 corresponds to a third light emitting unit. The light emitted by the light emitting unit 162 is also referred to as third light. It should be noted that detailed descriptions of the functional blocks already set forth will be omitted.

The receiver unit 164 receives light and outputs a voltage depending on an intensity of the light received. Specifically, the receiver unit 164 outputs a greater voltage for a higher intensity of the light received. The receiver unit 164 also determines the intensity of a portion of the light, emitted by the light emitting unit 162, which has been reflected off the white surface, to be a reference value. A voltage output by the receiver unit 164 in response to the receipt of light that has an intensity equivalent to the reference value is predetermined to be a reference voltage. The reference voltage is adjustable and is, for example, 500 mV. Adjusting the voltage that is output by the receiver unit 164 in response to the receipt of the light reflected off the white surface is also expressed as adjusting white balance.

Given the reference value and the reference voltage determined as such, a voltage output by the receiver unit 164 in response to the receipt of the portion of the light, emitted by the light emitting unit 162, which has been reflected (diffusely reflected) off a colored surface falls within a range of 0 or greater and 500 mV or less. A voltage output by the receiver unit 164 in response to the receipt of the portion of the light, emitted by the light emitting unit 162, which has been reflected (specularly reflected) off the reflective unit 134 is above the reference voltage of 500 mV, such as 700 mV, for example. This is because light specularly reflected has a higher intensity than light diffusely reflected.

The detection unit 166 senses whether the top edge of the document has passed a predetermined position along the conveying path 121, based on an intensity of the light received by the receiver unit 164. The predetermined position is a position at which the read unit 132 reads a portion of the document conveyed. The detection unit 166 has a threshold voltage to determine whether the receiver unit 164 has received the light specularly reflected or whether the receiver unit 164 has received the light diffusely reflected. The threshold voltage is a predetermined voltage that is greater than the reference voltage and less than a voltage output by the receiver unit 164 in response to the receipt of the light specularly reflected.

The detection unit 166, specifically, obtains a voltage output by the receiver unit 164 and compares the obtained voltage with the threshold voltage to detect the top edge of the document to be read. If the voltage output by the receiver unit 164 is greater than the threshold voltage, the detection unit 166 determines that the top edge of the document has not passed the predetermined position. On the other hand, if the voltage output by the receiver unit 164 is less than the threshold voltage, the detection unit 166 determines that the top edge of the document has already passed the predetermined position and the document is present at the predetermined position. When the detection unit 166 obtains a voltage output by the receiver unit 164 multiple times and if detected an obtained voltage that is greater than the threshold voltage and then detected an voltage that is less than the threshold voltage, the detection unit 166 detects that the top edge of the document has passed the predetermined position.

Figure 20:
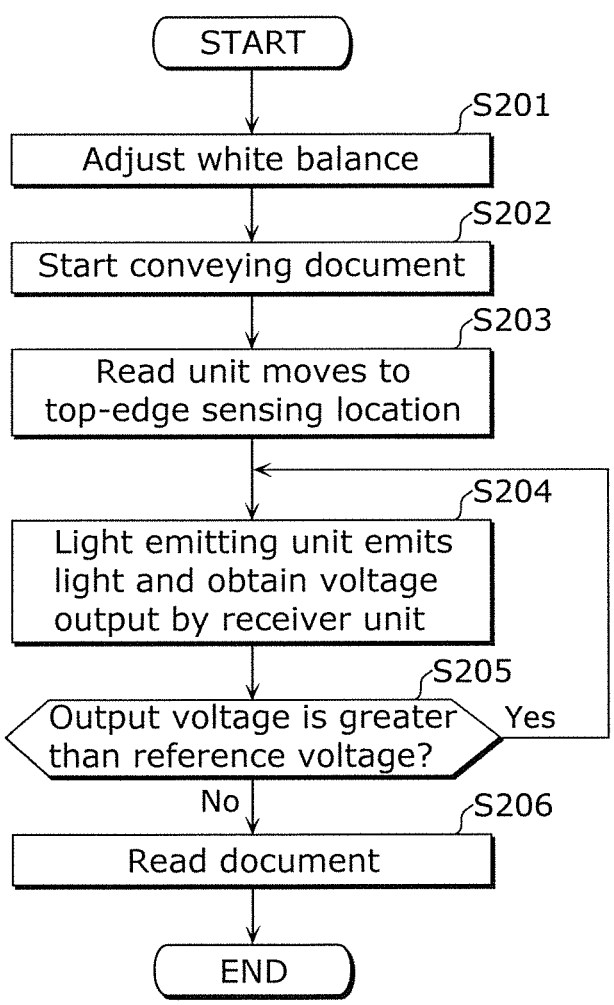
FIG. 20 is a flowchart illustrating a document-edge detection process performed by the scanner according to the embodiment 3.

FIG. 20 is a flowchart illustrating a document-edge detection process performed by the scanner according to the present embodiment. Referring to the figure, for example, a process by which a document is read while being conveyed along the conveying path 121 is to be described.

In step S201, the detection unit 166 adjusts white balance. Specifically, the read unit 132 moves to a position underneath the white surface part 136 or the white surface part 128. Then, the light emitting unit 162 emits light. A portion of the light is reflected by the white surface part 136 or the white surface part 128 and received by the receiver unit 164, and then the receiver unit 164 outputs a voltage depending on an intensity of the light received. A user adjusts the reference voltage in the detection unit 166, such that the voltage output by the receiver unit 164 is 500 mV. It should be noted that the reference voltage may be adjusted by the detection unit 166 independently.

In step S202, the conveying unit 122 starts conveying a document to be read. The processing of steps S203 through S206 (described below) proceeds while the document is being conveyed along the conveying path.

In step S203, the read unit 132 moves to a position (a top-edge sensing location) for detecting the top edge of the document. Specifically, the top-edge sensing location is a position at which the receiver unit 164 receives a portion of light, emitted by the light emitting unit 162, which has been specularly reflected by the reflective unit 134.

In steps S204 and S205, the read unit 132 performs detection operation for detecting the top edge of the document, using the light emitting unit 162 and the receiver unit 164. The detection operation is now described in detail, with reference to FIGS. 21A and 21B.

Figure 21A:
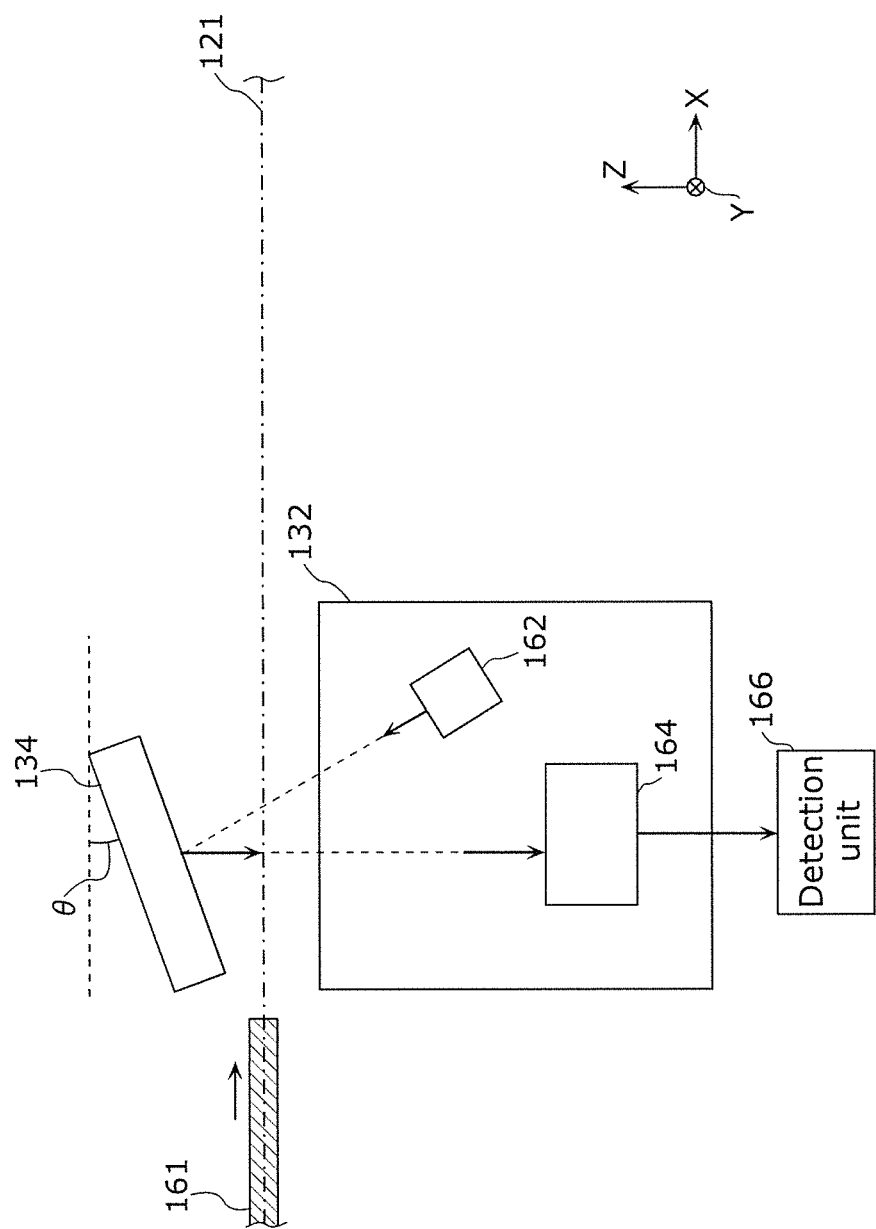
FIG. 21A is a first schematic diagram illustrating a method for detecting the top edge of a document, performed by a read unit according to the embodiment 3.

FIG. 21A is a first schematic diagram illustrating the method for detecting the top edge of the document, performed by the read unit according to the present embodiment. FIG. 21A shows the scanner 101, magnifying a portion including the read unit 132 which includes the light emitting unit 162 and the receiver unit 164, and the reflective unit 34. FIG. 21A shows a state in which a document 161 conveyed along the conveying path 121 has not reached the predetermined position yet.

The light emitting unit 162 emits light to a predetermined position on the conveying path 121.

The reflective unit 134 is disposed at a predetermined angle θ relative to X axis. The angle θ is set to a proper angle for reflecting, by the reflective unit 134 to the receiver unit 164, a portion of the light emitted by the light emitting unit 162. Specifically, the angle θ depends on installation angles and installation locations of the light emitting unit 162 and the receiver unit 164. The position of the read unit 132 shown in FIG. 21A corresponds to the top-edge sensing location.

As shown in FIG. 21A, prior to the arrival of the top edge of the document 161 at the predetermined position, the portion of the light emitted by the light emitting unit 162 travels to the reflective unit 134 and is specularly reflected by the reflective unit 134. Then the reflected portion of the light travels to the receiver unit 164 and is received by the receiver unit 164. Herein, the portion of the light, emitted by the light emitting unit 162, which has been reflected by the reflective unit 134, is also referred to as fourth light. In other words, the reflective unit 134 reflects, to the receiver unit 164 (the read unit 132), the portion of the light emitted by the light emitting unit 162, thereby sending the fourth light.

At this time, the receiver unit 164 outputs a voltage greater than the reference voltage. The detection unit 166 obtains the voltage output by the receiver unit 164, and, since the voltage is greater than the reference voltage, determines that the top edge of the document 161 has not passed the predetermined position yet. In this case, the scanner 101 performs the detection operation (step S205) again.

FIG. 21B is a second schematic diagram illustrating the method for detecting the top edge of the document, performed by the read unit according to the present embodiment. FIG. 21A shows a state in which the document 161 conveyed along the conveying path 121 has passed the predetermined position.

As shown in FIG. 21B, the portion of the light emitted by the light emitting unit 162 is diffusely reflected by the document 161 the top edge of which has passed the predetermined position. A portion of the diffusely reflected light, which travels to the receiver unit 164, is received by the receiver unit 164. At this time, the receiver unit 164 outputs a voltage lower than the reference voltage. The detection unit 66 obtains the voltage output by the receiver unit 164 and, since the voltage is lower than the reference value, determines that the top edge of the document 161 has already passed the predetermined position. In this case, the scanner 101 ends the detection operation, and proceeds to step S206.

It should be noted that if obtained a voltage output by the receiver unit 164 multiple times, the detection unit 166 can determine a point in time at which the light emitted by the light emitting unit 162 is blocked by the document 161 between the state illustrated in FIG. 21A and the one illustrated in FIG. 21B. The detection unit 166 can then determine this point in time to be a point in time at which the top edge of the document 161 has just passed the predetermined position.

While the detection unit 166 obtains a voltage multiple times, it should be noted that obtaining a voltage at least twice is sufficient for the detection unit 166 to make the above determination. Specifically, the detection unit 166 obtains a voltage output by the receiver unit 164 twice, and if an intensity of the reflected light received by the receiver unit 164 first time is higher than the threshold and an intensity of the reflected light received by the receiver unit 164 is lower than or equal to the threshold, the detection unit 166 senses that the top edge of the document has passed the predetermined position between the time at which the first reflected light is received and the time at which the second reflected light is received.

Returning to FIG. 20, in step S206, the read unit 132 reads the document 161. The read operation is now described in detail, with reference to FIG. 22.

FIG. 22 is a schematic diagram illustrating a method for reading a document, performed by the read unit according to the present embodiment.

If the top edge of the document 161 is detected in step S105, the read unit 132 moves to a position underneath the white surface part 136. The position of the read unit 132 shown in FIG. 22 is also referred to as an ADF reading location.

The read unit 132 at the ADF reading location reads the document 161. Here, the reading of the document 161 starts at a point in time at which the top edge of the document 161 has passed the predetermined position. This point in time is determined to be a point in time taken from the point in time at which the detection unit 66 has detected the top edge of the document 161 in step S205 to a point in time at which the document 161 has been conveyed to the predetermined position (i.e., a distance between the top-edge sensing location and the ADF reading location/a conveying speed).

Here, the read unit 132 reads the document 161, using the white surface part 136 as a background, thereby more properly reading colors of the document 161.

It should be noted that the read unit 132 does not necessarily use the white surface part 136 as a background when reading the document 161. For example, the read unit 132 may stay at the ADF reading location when reading the document 161, using the reflective unit 134 as a background. In that case, compared to when reading the document using the white surface part 136 as a background, the read unit 132 may not be able to read the colors of the document properly. This is because the read unit 132 converts the intensity of the light reflected by the document 161 into readings (colors), in an attempt to read the document 161 using the white surface as a background. If the read unit 132 failed to read the colors accurately, alternatively, right colors can be obtained by properly correcting the readings.

It should be noted that the white surface part 136 may be moved while keeping the position of the read unit 132. Specifically, the white surface part 136 may be moved to a position between the reflective unit 134 and the read unit 132. In this case also, the document 161 can be read, using the white surface part 136 as a background.

As described above, the scanner according to the present embodiment can properly sense the top edge of a document, using the read unit which is mounted thereon to read documents. The read unit receives the light diffusely reflected by a document when reading the document, whereas receiving the light specularly reflected by the reflective unit if no document is at the reading location. The detection unit uses this feature to distinguish between the light diffusely reflected by a document and the light specularly reflected by the reflective unit, and sense the top edge of the document when the receiver unit 164 in a state for receiving light specularly reflected has changed to a state for receiving light diffusely reflected. The read sensor can detect the top edge of the document as such. This obviates the need for separately mounting a document sensor. Thus, the read sensor can be used also as a document sensor as well as reducing erroneous detection of the top edge of a document.

Embodiment 4

In the present embodiment, a scanner which properly detects a size of a document using a document read sensor, and uses the document read sensor also as a document sensor as well as reducing erroneous detection of the top edge of the document, will be described. It should be noted that the scanner may be achieved independently as a scanner which uses the document read sensor also as the document sensor as well as reducing an erroneous detection of the top edge of a document.

The scanner is an ADF scanner which reads documents while sequentially passing them by ADF from the rear of the scanner to the front.

Figure 23:
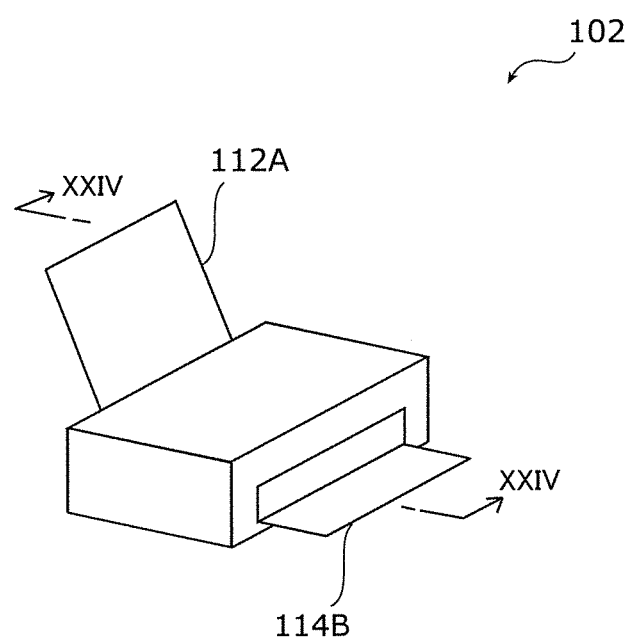
FIG. 23 is an external view of a scanner according to an embodiment 4.
Figure 24:
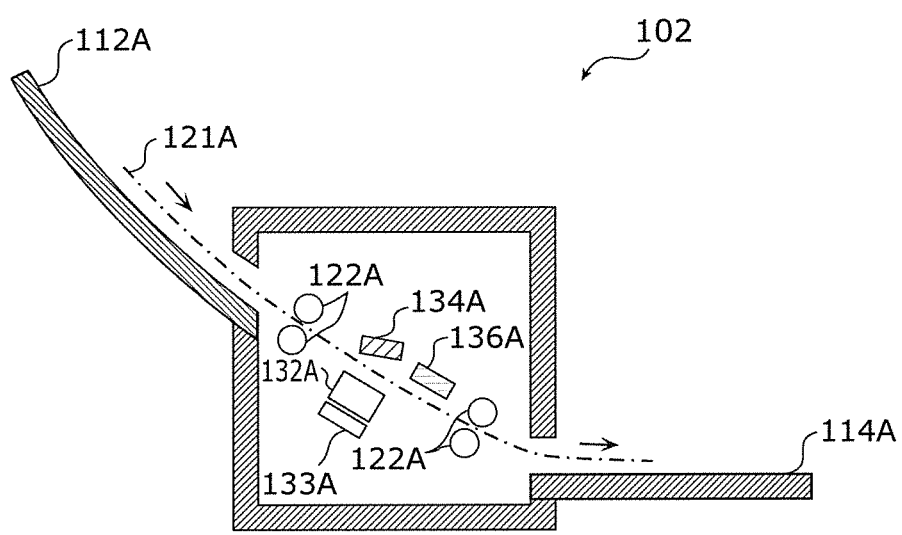
FIG. 24 is a cross-sectional view of the scanner according to the embodiment 4, taken along XXIV-XXIV in FIG. 23.

FIG. 23 is an external view of the scanner according to the present embodiment. FIG. 24 is a cross-sectional view of the scanner according to the present embodiment, taken along XXIV-XXIV in FIG. 23.

As shown in FIGS. 23 and 24, a scanner 102 includes a paper input tray 112A, a paper output tray 114A, a conveying unit 122A, a read unit 132A, the moving unit 133A, a reflective unit 134A, and a white surface part 136A. The components referred to by the same reference signs as those according to the embodiment 3 will be described, focusing on different functionality. Descriptions of the same features as the embodiment 3 are omitted.

The paper input tray 112A is a tray for placing the document to be read thereon. The paper input tray 112A is provided on the rear side of the scanner 102. A plurality of documents may be placed on the paper input tray 112A.

The paper output tray 114A is a tray on which a read document is placed. The paper output tray 114A is provided on the front side of the scanner 102.

The conveying unit 122A feeds one sheet of document of documents placed on the paper input tray 112A by conveying the document along a conveying path 121A. The conveying path 121A is a substantially linear path extending from the paper input tray 112A provided on the rear side of the scanner 102 to the paper output tray 114A provided on the front side of the scanner 102.

The read unit 132A is provided along one side relative to the conveying path 121A. The reflective unit 134A and the white surface part 136A are provided along the other side relative to the conveying path 121A, the other side being opposite to the side along which the read unit 132A is provided.

The moving unit 133A moves the read unit 132A along the conveying path 121A between a position facing the reflective unit 134A and a position facing the white surface part 136A.

As described above, according to the present invention, even an ADF scanner which has the linear conveying path can use the read sensor also as a document sensor as well as reducing erroneous detection of the top edge of a document.

Some or the whole of the embodiment described above can, but not limited to, be described as follows:

(1) A scanner including: a conveying unit which conveys a document to be read along a conveying path; a read unit which includes a light emitting unit which emits light to a predetermined position on the conveying path and a receiver unit which receives the light, the read unit being disposed along one side relative to the conveying path; a reflective unit which reflects, to the receiver unit, a portion of the light emitted, the reflective unit being disposed along the other side relative to the conveying path, the other side being opposite to the side along which the read unit is disposed; and a detection unit which senses whether an edge of the document ahead in the forward direction of document conveyance has passed the predetermined position, based on an intensity of the light received by the receiver unit.

(2) The scanner according to (1), wherein the reflective unit specularly reflects the portion of the emitted light to the receiver unit, the detection unit detects that the intensity of the light received by the receiver unit is lower than a threshold as a result of the portion of the emitted light being diffusely reflected by the document conveyed to the predetermined position, thereby sensing that the edge of the document ahead in the forward direction of document conveyance has passed the predetermined position.

(3) The scanner according to (2), wherein the receiver unit receives the light at a first time and a second time later than the first time, the detection unit detects that an intensity of the light received by the receiver unit at the first time is higher than the threshold and an intensity of the light received by the receiver unit at the second time is lower than or equal to the threshold, thereby sensing that the edge has passed the predetermined position at a time between the first time and the second time.

(4) The scanner according to (2) or (3), further includes a white surface part having a white surface facing the light emitting unit, the white surface part being disposed along an opposite side to the read unit relative to the conveying path, wherein the light emitting unit emits the light to the white surface part if the detection unit detects the edge, the receiver unit reads the document by receiving the portion of the light, emitted by the light emitting unit, which has been diffusely reflected by a read surface of the document while an opposite surface of the document to the read surface is facing the white surface part.

(5) The scanner according to (4), wherein the reflective unit and the white surface part are disposed side by side along the conveying path, the read unit is further movable along the conveying path, the read unit (i) receives, at a position facing the reflective unit, the light reflected off the reflective unit, (ii) moves to a position facing the white surface part if the detection unit detects the edge, and (iii) reads the document at the position facing the white surface part.

(6) The scanner according to (4) or (5), wherein the threshold is higher than the intensity of light, which is a portion of the emitted light which has been reflected by the white surface part and received by the receiver unit, and lower than the intensity of the light which is a portion of the emitted light which has been reflected by the reflective unit and received by the receiver unit.

(7) The scanner according to (1) to (6), wherein the read unit is a contact image sensor (CIS) unit.

According to the above-described (1), the scanner can properly sense the top edge of the document, using the read unit mounted on the scanner to read a document. The read unit senses the top edge of the document, based on whether the read unit receives the light reflected off the reflective unit. Since the read sensor can detect the top edge of the document, the scanner is not required to separately mount a document sensor. Thus, the read sensor can be used also as a document sensor as well as reducing erroneous detection of the top edge of a document.

According to the above-described (2), the scanner can properly sense the top edge of a document, using the read unit mounted thereon to read documents. The read unit receives the light diffusely reflected by a document when reading the document, whereas receiving the light specularly reflected by the reflective unit if no document is at the reading location. The detection unit uses this feature to distinguish between the light diffusely reflected by a document and the light specularly reflected by the reflective unit, and sense the top edge of the document when the receiver unit 164 in a state for receiving light specularly reflected has changed to a state for receiving light diffusely reflected. The read sensor can detect the top edge of the document as such. This obviates the need for separately mounting a document sensor. Thus, the read sensor can be used also as a document sensor as well as reducing erroneous detection of the top edge of a document.

According to the above-described (3), the scanner senses the top edge of the document, based on intensities of the light obtained by the receiver unit receiving the light two times. Specifically, if the receiver unit receives the light specularly reflected by the reflective unit at the first time of the two times, and receives the light diffusely reflected by the document at the second time of the two times, the scanner senses that the top edge of the document has passed a predetermined position at a time between the two times. This can more precisely reduce erroneous detection of the top edge of a document.

According to the above-described (4), the scanner reads a document, using a white surface as a background. This allows the scanner to read colors of the document more properly.

According to the above-described (5), by moving the read unit, light emission to the reflective unit and to the white surface part can be conducted properly.

According to the above-described (6), the detection unit determines, relative to the threshold, an intensity of the light received by the receiver unit, thereby more properly detecting an edge of the document. Thus, the scanner can reduce erroneous detection of the top edge of the document.

According to the above-described (7), using a CIS unit included in a conventional scanner, the scanner can use the read sensor also as the document sensor as well as reducing erroneous detection of the top edge of a document.

Moreover, each of the devices described above may be configured as, specifically, a computer system which includes a microprocessor, a read only memory (ROM), a random access memory (RAM), a hard disk drive, a display unit, a keyboard, a mouse, etc. The RAM or the hard disk drive stores a computer program. Each device performs its functionality by the microprocessor operating according to the computer program. Here, the computer program is, to achieve predetermined functionality, a combination of instruction codes indicating instructions to the computer.

Furthermore, some or the whole of the components included in each of the devices described above may be formed by one system LSI (Large Scale Integration). The system LSI is a super multi-function LSI fabricated by integrating a plurality of components on one chip, and is, specifically, a computer system which includes a microprocessor, a ROM, a RAM, etc. The RAM stores a computer program. The system LSI performs its functionality by the microprocessor operating according to the computer program.

Furthermore, some or the whole of the components included in each of the devices described above may be formed by an IC card or a single module detachable from the device. The IC card or the module is a computer system which includes a microprocessor, a ROM, a RAM, etc. The IC card or the module may include the super multi-function LSI described above. The IC card or the module performs its functionality by the microprocessor operating according to a computer program. The IC card or the module may be of tamper-resistant.

Moreover, the present invention may be implemented in the methods described above. Moreover, the present invention may be achieved in a computer program implementing such methods via a computer, or may be implemented in a digital signal including the computer program.

Furthermore, the present invention may be achieved in a non-transitory computer-readable recording medium storing the computer program or the digital signal, such as a flexible disk, a hard disk, CD-ROM, MO, DVD, DVD-ROM, DVD-RAM, BD (Blu-ray (registered trademark) Disc), and a semiconductor memory. Alternatively, the present invention may be implemented in the digital signal stored in such a non-transitory recording medium.

Moreover, the present invention may be achieved in transmitting the computer program or the digital signal via an electric communication line, a wireless or wired communication line, a network represented by the Internet, data broadcast, etc.

Moreover, the present invention may be achieved in a computer system which includes a microprocessor and a memory. The memory may store the computer program and the microprocessor may operate according to the computer program.

Moreover, the program or the digital signal may be transferred via the network or the like or transferred in the non-transitory recording medium, and executed in another independent computer system.

Furthermore, the above-described embodiments may be combined.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is applicable to a scanner which properly detects a document size, using a document read sensor. Specifically, the present invention is applicable to an ADF scanner.

The invention claimed is:

1. A scanner comprising:
   a medium which is conveyed in a first direction along a conveying path;
   an image read unit disposed extending in a second direction perpendicular to the first direction in a plane including the medium;
   a first light emitting unit that emits first light to the image read unit, the first light emitting unit being disposed along an opposite side to the image read unit relative to the conveying path and located upstream from the image read unit in a conveyance direction of the medium; and
   a detection unit that detects a length of the medium in the second direction, based on a variation in intensity of the first light received by the image read unit in the second direction.

2. The scanner according to claim 1, wherein
   the first light emitting unit emits the first light in a manner that a direction in which the first light travels and a direction in which the medium is conveyed form an acute angle.

3. The scanner according to claim 2, further comprising
   a second light emitting unit disposed along a same side as the image read unit relative to the conveying path, wherein
   the first light emitting unit stops emitting the first light after the detection unit detects the length;
   the second light emitting unit starts emitting second light to the medium after the detection unit detects the length; and
   the image read unit receives a portion of the second light reflected by the medium, to read the medium, the second light being emitted by the second light emitting unit.

4. The scanner according to claim 3, wherein
   the detection unit includes a line sensor, and detects the length of the medium in the second direction, based on the information on the intensity of the first light received by the line sensor.

5. The scanner according to claim 4, wherein
   the detection unit detects the length of the medium in the second direction, based on whether the intensity of the first light received by the line sensor is higher than a threshold which is higher than an intensity of a portion of the first light, emitted by the first light emitting unit, which has transmitted through the medium and received by the line sensor, and lower than the first light emitted by the first light emitting unit and received by the line sensor.

6. The scanner according to claim 3, further comprising
a third light emitting unit disposed along a same side as the image read unit relative to the conveying path, wherein
the first light emitting unit includes a reflective unit which reflects, to the detection unit, a portion of third light emitted by the third light emitting unit, to send fourth light, and
the detection unit detects an edge of the medium, based on information on an intensity of the fourth light.

7. The scanner according to claim 6, wherein
the detection unit senses the edge of the medium, based on information on an intensity of a portion of the third light diffusely reflected by the medium.

8. The scanner according to claim 7, wherein
the image read unit receives light at a first time and a second time later than the first time, and
if an intensity of the light received by the image read unit at the first time is higher than a threshold and an intensity of the light received by the image read unit at the second time is lower than or equal to the threshold, the detection unit detects that passage of the edge at a time between the first time and the second time.

9. The scanner according to claim 8, further comprising
a white surface part having a white surface facing the third light emitting unit, disposed along an opposite side to the image read unit relative to the conveying path, wherein
the third light emitting unit emits the third light to the white surface part if the detection unit detects the edge, and
in a state where an opposite surface of the medium to a read surface is facing the white surface part, the image read unit receives the portion of the third light diffusely reflected by the medium, to read the medium.

10. The scanner according to claim 9, wherein
the reflective unit and the white surface part are disposed side by side along the conveying path,
the image read unit is further movable along the conveying path,
the image read unit (i) receives, at a position facing the reflective unit, the portion of the third light reflected by the reflective unit, (ii) moves to a position facing the white surface part if the detection unit detects the edge, and (iii) reads the medium at the position facing the white surface part.

11. The scanner according to claim 9, wherein
the threshold is higher than an intensity of a portion of the third light reflected by the white surface part and received by the image read unit, and lower than an intensity of the portion of the third light reflected by the reflective unit and received by the image read unit.

* * * * *